US012435785B2

(12) United States Patent
Montagna et al.

(10) Patent No.: US 12,435,785 B2
(45) Date of Patent: Oct. 7, 2025

(54) PLANETARY GEAR FOR A TRANSMISSION FOR AN AIRCRAFT CAPABLE OF HOVERING

(71) Applicant: LEONARDO S.P.A., Rome (IT)

(72) Inventors: Federico Montagna, Samarate (IT); Daniele Podda, Samarate (IT); Diego Scaltritti, Samarate (IT)

(73) Assignee: LEONARDO S.P.A., Rome (IT)

( * ) Notice: Subject to any disclaimer, the term of this patent is extended or adjusted under 35 U.S.C. 154(b) by 114 days.

(21) Appl. No.: 18/551,029

(22) PCT Filed: Dec. 20, 2021

(86) PCT No.: PCT/IB2021/062033
§ 371 (c)(1),
(2) Date: Sep. 18, 2023

(87) PCT Pub. No.: WO2022/200853
PCT Pub. Date: Sep. 29, 2022

(65) Prior Publication Data
US 2024/0159310 A1 May 16, 2024

(30) Foreign Application Priority Data
Mar. 24, 2021 (EP) ..................................... 21164529

(51) Int. Cl.
| | |
|---|---|
| *F16H 57/08* | (2006.01) |
| *B64D 35/00* | (2006.01) |
| *F16C 19/38* | (2006.01) |
| *F16C 33/30* | (2006.01) |
| *F16C 33/36* | (2006.01) |
| *F16C 33/46* | (2006.01) |

(Continued)

(52) U.S. Cl.
CPC ........... *F16H 57/082* (2013.01); *B64D 35/00* (2013.01); *F16C 19/38* (2013.01); *F16C 33/303* (2013.01);
(Continued)

(58) Field of Classification Search
CPC .. F16C 33/3837; F16C 33/48; F16C 33/3706; F16H 1/28; F16H 2057/085
See application file for complete search history.

(56) References Cited

U.S. PATENT DOCUMENTS 5,310,269 A * 5/1994 Wardle .................... F16C 33/36
384/450
5,413,416 A * 5/1995 Grunze ................. F16C 33/495
384/577

(Continued)

FOREIGN PATENT DOCUMENTS

| | | |
|---|---|---|
| EP | 2894359 | 7/2015 |
| EP | 2952760 | 12/2015 |

(Continued)

OTHER PUBLICATIONS

JP H07259864 A (Year: 1995).*

(Continued)

*Primary Examiner* — Derek D Knight
(74) *Attorney, Agent, or Firm* — Leason Ellis LLP

(57) ABSTRACT

A description is provided of a planetary gear comprising a sun rotatable around a first axis, a crown angularly fixed with respect to the first axis; two satellites that are meshing, rotatable around respective second axes; a satellite carrier rotatable around the first axis and comprising at least two first pins with respect to which the satellites are rotatable around respective second axes; and a plurality of bearings comprising: a first ring defining a first raceway that is at least partially spherical; a second ring defining a second raceway; and a plurality of rolling bodies shaped as an hourglass rolling on the first spherical raceway and a second raceway; each rolling body being in contact with the raceways at a line with axial ends lying on respective straight lines tilted between them and converging in a point lying on a median (Continued)

plane of the rolling body and on the second axis; the straight lines define a first angle, whose bisector lies on the first median.

23 Claims, 10 Drawing Sheets

(51) Int. Cl.
  *F16C 33/48* (2006.01)
  *F16C 33/58* (2006.01)
  *F16H 1/28* (2006.01)
(52) U.S. Cl.
  CPC .......... *F16C 33/36* (2013.01); *F16C 33/4623* (2013.01); *F16C 33/48* (2013.01); *F16C 33/585* (2013.01); *F16H 1/28* (2013.01); *F16C 2326/43* (2013.01); *F16C 2361/61* (2013.01); *F16H 2057/085* (2013.01)

(56) References Cited

U.S. PATENT DOCUMENTS

| | | | | |
|---|---|---|---|---|
| 6,361,309 | B1* | 3/2002 | Burzynski | F16C 33/3856 425/DIG. 58 |
| 9,227,720 | B2* | 1/2016 | Habibvand | F16C 33/783 |
| 9,890,814 | B2* | 2/2018 | Habibvand | B64C 9/00 |
| 10,077,808 | B2* | 9/2018 | Cowles, Jr. | F16C 23/086 |
| 2011/0182539 | A1* | 7/2011 | Kolar | F16C 33/7856 384/488 |
| 2011/0274382 | A1* | 11/2011 | Berns | F16C 33/62 29/898.062 |
| 2016/0290401 | A1* | 10/2016 | Murakami | F16C 33/7826 |
| 2020/0011411 | A1* | 1/2020 | Gilliland | B64C 29/0033 |

FOREIGN PATENT DOCUMENTS

| | | | |
|---|---|---|---|
| EP | 2957781 | | 12/2015 |
| EP | 3064802 | | 9/2016 |
| EP | 3786060 | | 3/2021 |
| JP | H07259864 A | * | 10/1995 ............ F16C 33/366 |
| WO | 2020109879 | | 6/2020 |

OTHER PUBLICATIONS

International Search Report and Written Opinion in corresponding International Patent Application No. PCT/IB2021/062033, mailed Feb. 18, 2022 (16 pages).

International Preliminary Report on Patentability in corresponding International Patent Application No. PCT/IB2021/062033, mailed May 31, 2022 (19 pages).

* cited by examiner

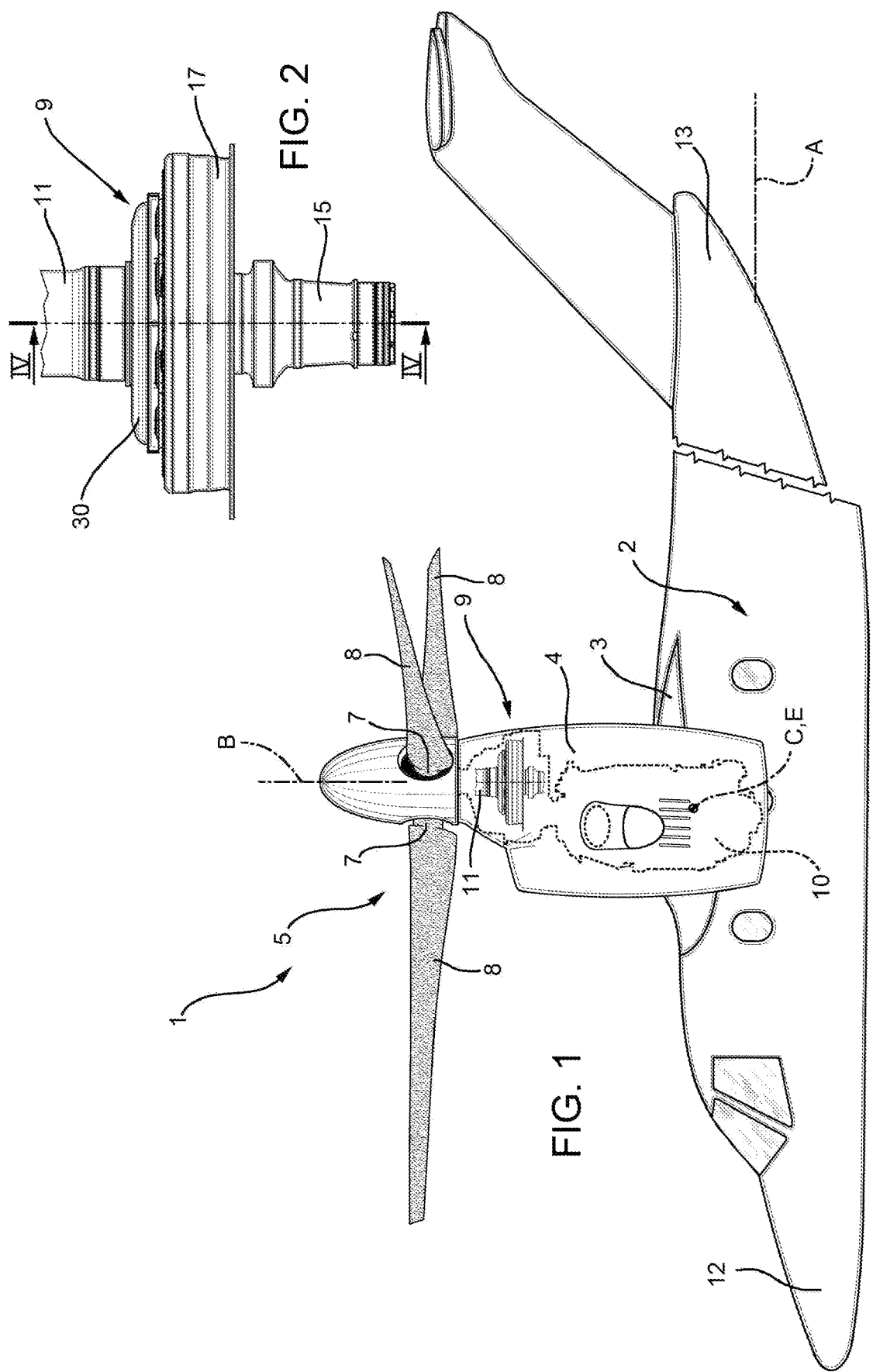

PLANETARY GEAR FOR A TRANSMISSION FOR AN AIRCRAFT CAPABLE OF HOVERING

CROSS-REFERENCE TO RELATED APPLICATIONS

This Patent Application is a U.S. National Phase Application under 35 U.S.C. § 371 of International Patent Application No. PCT/IB2021/062033, filed on Dec. 20, 2021, which claims priority from European Patent Application No. 21164529.6, filed on Mar. 24, 2021, all of which are incorporated by reference, as if expressly set forth in their respective entireties.

TECHNICAL FIELD

The present invention relates to a planetary gear for a transmission for an aircraft capable of hovering, such as a helicopter or convertiplane or heliplane.

BACKGROUND ART

As is known, helicopters are generally provided with transmissions adapted to transmit the motion from one or more turbines to the rotors, main and/or tail, and/or from the turbine to a plurality of accessory devices, i.e., responsible, for example, to supply the energy necessary for the operation of on-board equipment.

Helicopters generate the lift needed to sustenance by rotating the blades of the main rotor. As a result, helicopters can land/take off without the need for horizontal speed and using particularly small surfaces. Moreover, helicopters are able to hover and to fly at relatively low altitudes and speeds, making them particularly manoeuvrable and suitable for demanding manoeuvres such as rescuing people in the mountains or at sea.

Nevertheless, helicopters have inherent limitations in terms of maximum operational altitude, which is around 6096 m (20000 feet), and maximum operational speed, which cannot exceed 277.8 km/h (150 knots).

In order to meet the demand for aircrafts capable of presenting the same manoeuvrability and comfort of use as the helicopter and at the same time overcoming the inherent limitations mentioned above, convertiplanes and heliplanes are known.

In greater detail, convertiplanes of the known type essentially comprise:

a fuselage extending along a first longitudinal axis;
a pair of half-wings stretching cantilevered from respective parts of the fuselage opposite one another, and having respective free ends opposite to the fuselage and aligned along a second transverse axis substantially orthogonal to the first longitudinal axis;
a pair of nacelles carrying the respective motors and fixed with respect to the relative half-wings; and
a pair of rotors rotatable around respective third axes and operatively connected to respective motors.

Each rotor comprises, in a known manner, a drive shaft rotatable around the relative third axis and a plurality of blades articulated on the drive shaft, in particular circumferentially distributed around the free end of the drive shaft that comes out from the respective nacelle.

The convertiplanes are also able to selectively assume:

an "airplane" configuration in which the rotors are arranged with respective third axes substantially parallel to the first axis of the convertiplane; or a "helicopter" configuration, in which the rotors are arranged with the respective third axes substantially vertical and transverse to the first axis of the convertiplane.

Thanks to the possibility of tilting the rotors, the convertiplanes are able to take off and land like a helicopter, i.e. in a direction substantially perpendicular to the first longitudinal axis of the convertiplane, without the need for a runway.

In addition, the convertiplanes are able to take off and land on rough terrain and without generating a noise level incompatible with an urban settlement.

In addition, the convertiplanes are capable of hovering when arranged in the helicopter configuration.

Furthermore, the convertiplanes can reach and maintain cruising speeds of approximately 463-555.6 km/h (250-300 knots) and flight altitudes of the order of 9144 m (30000 feet) when arranged in the airplane configuration.

This cruising speed is well above the value of about 277.8 km/h (150 knots) that defines the maximum cruising speed of helicopters.

Similarly, the above altitude is well above that typical of helicopters and allows convertiplanes arranged in an airplane configuration to avoid the clouds and atmospheric disturbances characteristic of lower altitudes.

The heliplanes, such as, for example, the EUROCOPTER X-3 aircraft comprise, in addition to components commonly found in a known helicopter such as a main rotor with vertical axis, a pair of half-wings stretching cantilevered from respective parts of the fuselage of the heliplane along a fourth transverse axis substantially orthogonal to a fifth longitudinal axis of the aircraft and to the axis of rotation of the main rotor.

In more detail, each of the half-wings carries a respective pushing propeller which comprises, in a known manner, a drive shaft operable by a relative motor and a plurality of blades articulated on the drive shaft.

In particular, each drive shaft is rotatable around a relative sixth axis substantially parallel to the longitudinal axis of the heliplane, i.e., a horizontal axis.

The heliplane is therefore able, in the same way as the convertiplane, to take off and land in a vertical direction by means of the main rotor and to fly in forward flight by means of the propellers and the aforesaid half-wings.

During the forward flight, the main rotor rotates idle while thrust is generated by the propellers.

Regardless of whether it is a helicopter, a convertiplane or a heliplane, these aircrafts comprise one or more mechanical transmissions adapted to transmit motion from one or more turbines to the rotors.

Such mechanical transmissions generally employ one or more planetary gears within the reduction chain, which is adapted to transmit power with an adequate torque and number of revolutions to the actuation shaft of the main rotor.

In the simplest form, the aforesaid planetary gear essentially comprises:

a first toothed wheel defined as sun wheel, which is rotatable around a seventh fixed axis;
a second fixed toothed wheel defined as crown wheel, which has an eighth axis coinciding with the seventh axis; and
a plurality of toothed wheels, defined as satellites, which mesh with the sun and the crown and are rotatable around respective ninth movable axes.

The planetary gears also comprise a satellite carrier, which is rotatable around the seventh axis and is connected to the satellites.

More precisely, the satellites are rotatable around the respective ninth axes relative to respective pins of the satellite carrier and describe a motion of revolution around the seventh axis integral with the satellite carrier.

Relative rotation between satellites and the pin of the satellite carrier is allowed by respective rolling bearings.

Each rolling bearing comprises, in turn:
- a first ring angularly integral with the respective pin and defining a first raceway;
- a second ring radially external with respect to the first ring, angularly integral with the respective satellite, and defining a second raceway; and
- a plurality of rolling bodies, preferably a double crown of cylindrical rollers, which roll on the first and second raceway.

In a known embodiment, mechanical power enters the planetary gear via the sun and is transmitted to the satellite carrier.

The satellite carrier also has a power take-off connected to the rotor shaft in order to transmit to the latter the correct drive torque with the correct angular speed.

The satellite carrier necessarily has an asymmetrical shape with respect to a plane orthogonal to the seventh axis.

This is due to the fact that the power take-off connecting the drive shaft to the satellite carrier cannot be placed on the same plane of symmetry of the satellites that is orthogonal to the seventh axis, due to the presence of the sun and the crown in position respectively radially internal and external with respect to the satellites.

Because of such geometric asymmetry of the satellite carrier, the stiffness of the same is necessarily asymmetrical with respect to the aforesaid plane orthogonal to the seventh axis.

Under operating conditions, the sun transmits a considerable drive torque to the satellite carrier.

Due to the asymmetrical stiffness of the satellite carrier, the transmission of the drive torque from the sun to the satellite carrier generates deflection and, therefore, misalignment of the ninth axes of rotation of the satellites with respect to the seventh axis of rotation of the sun, generating significant consequences on the proper operation of the planetary gear.

More precisely, the misalignment between the ninth axes and the seventh axis, even if in reduced quantity, leads to alterations in the distribution of the local pressure in the contact segments between the satellites and the sun.

Such alterations inevitably lead to damage and a consequent reduction in the service life of the planetary gear.

In order to mitigate this undesirable effect, it is known to employ a barrel roller bearing as the rolling bodies, for example from EP-A-3064802.

The first raceway of the inner ring is concave, mates with a corresponding concave shape of the rolling bodies, and comprises a pair of shoulders cooperating axially with the rolling bodies.

The second raceway of the outer ring is shaped as a spherical surface but it cannot tilt around the respective ninth axis, as it is constrained by the meshing between respective satellite and crown.

The rolling bodies are, therefore, guided in their position with respect to the ninth axis by the inclination of the inner ring with respect to the seventh axis.

The aforesaid rolling bearings are known to be capable of transmitting considerable loads and allowing relevant angular inclinations between the rotationally fixed outer ring and the inner ring, when it is rotatable around with respect to the outer ring.

The Applicant observed that the application of the aforesaid bearings to the planetary gearboxes of the transmission of an aircraft capable of hovering alters the kinematics of the rolling bodies. This is because in a reference system integral with the drive shaft of the rotor, the first inner ring is angularly fixed and the second outer ring is rotatable with respect to the inner ring.

Consequently, the second outer ring loses its capability to freely allow any inclination of the first inner ring without generating slidings on the rolling bodies.

On the contrary, the Applicant observed that the inclination of the ninth axes of the pins of the satellites with respect to the seventh axis of the sun leads to non-negligible slidings of the rolling bodies on the second raceway defined by the second outer ring.

More precisely, during each rotation around the relative ninth axis, the rolling bodies of each bearing describe, in addition to the mere rolling motion on the first and second raceway, in a cyclic manner an alternating axial motion astride an equatorial plane of the second raceway.

This axial movement is due to the deformation of the planetary carrier under conditions of torque transmission from the sun to the drive shaft.

This axial movement causes sliding which results in loss of transmitted power, generation of heat and local pressure peaks, reductions in the capability of the planetary gear to operate correctly under conditions of reduced or no lubricating oil supply, with a clear reduction in the service life of the planetary gear.

There is a need in the sector to contain to increase the life and operating performance of the planetary gear.

US-A-2020/0011411 describes a planetary gear provided, for each satellite, with a spherical support and a cylindrical roller bearing. The spherical support allows the oscillation of the cylindrical roller bearing, so as to compensate for any angular misalignment between the satellite and the relative pin of the planetary carrier and to allow its relative rotation.

EP-B-2894359, EP-B-2952760 and EP-B-2957781 describe the use of a swivelling ball joint for a flap edge control device for an aircraft wing. The joint comprises a radially inner ring defining a raceway shaped as a spherical surface, and concave, hourglass-shaped rolling bodies; these rolling bodies are intended to reduce and nearly eliminate friction internal to the joint. This resistant friction is particularly relevant in the case of joints subjected to heavy loads and quickly leads to wear of the internal surfaces subject to a sliding contact.

WO-A1-2020/109879 discloses a hover-capable aircraft comprising a drive unit, a rotor and a transmission interposed between the drive unit and the rotor; the transmission comprises a gear; the gear, in turn, comprises a main body rotatable about a first axis and a plurality of first teeth projecting in a cantilever fashion from the main body; the gear comprises a first pair of first rings axially opposite to each other and cooperating with the gear so as to exert a radial force on the gear.

U.S. Pat. No. 5,310,269 discloses a roller bearing comprising inner and outer rings and rollers therebetween. The rings have no ribs, flanges or grooves but instead axial inner surfaces of the rings provide raceways, which are substantially convex and the axial outer surfaces of the rollers are substantially concave to match. These concave and convex surfaces contact one another over contact zones. Each roller has an external surface, which is asymmetrical relative to the center of the roller and the geometry is such that during use frictional moments develop at the contact zones between the rollers and the rings to generate a positive skew force on the rollers. This renders the bearing self-tracking.

US-A1-2016290401 discloses a rolling bearing including: inner and outer members, rolling elements in a raceway space, flexible annular sealing members which close openings at both ends of the raceway space, and annular metal shield members. Each sealing member is formed in three-dimensional shape such that the sealing member in a natural state is convex inwardly between outer and inner circumferential edge portions and the inner circumferential edge portion is elastically in surface contact with the outer surface of the inner member when the sealing member is fitted to the outer member. Each metal shield member is fixed to the outer member in a state that the outer circumferential edge portion of each sealing member is sandwiched between the metal shield member and the outer member. Each metal shield member covers part of each sealing member without contacting the inner member.

US-A1-2011/182539 discloses a bearing assembly including an inner race and an outer race that is radially spaced from the inner race for receiving roller elements therebetween. A collar is adjacent to and fixed relative to the inner race. A sealing member is fixed relative to the outer race. The sealing member slidably and sealingly engages the collar axially and radially to maintain a seal between the sealing member and the collar during a misalignment of the inner race relative to the outer race and a predetermined degree of misalignment of the inner race relative to the outer race.

DISCLOSURE OF INVENTION

Aim of the present invention is to realize a planetary gear, which allows to satisfy, in a simple and economic way, the above-mentioned requirement.

The aforesaid aim is achieved by a planetary gear as claimed in claim 1.

BRIEF DESCRIPTION OF THE DRAWINGS

Further features and advantages of the present invention will become apparent from the detailed description that follows, provided by way of non-limiting example and with reference to the accompanying drawings, wherein:

FIG. 1 shows a side view of an aircraft capable of hovering, in particular a convertiplane;

FIG. 2 shows on a greatly enlarged scale a terminal stage of a transmission of the aircraft of FIG. 1 and incorporating a planetary gear realized according to a first embodiment of the present invention;

BEST MODE FOR CARRYING OUT THE INVENTION

Figure 3:
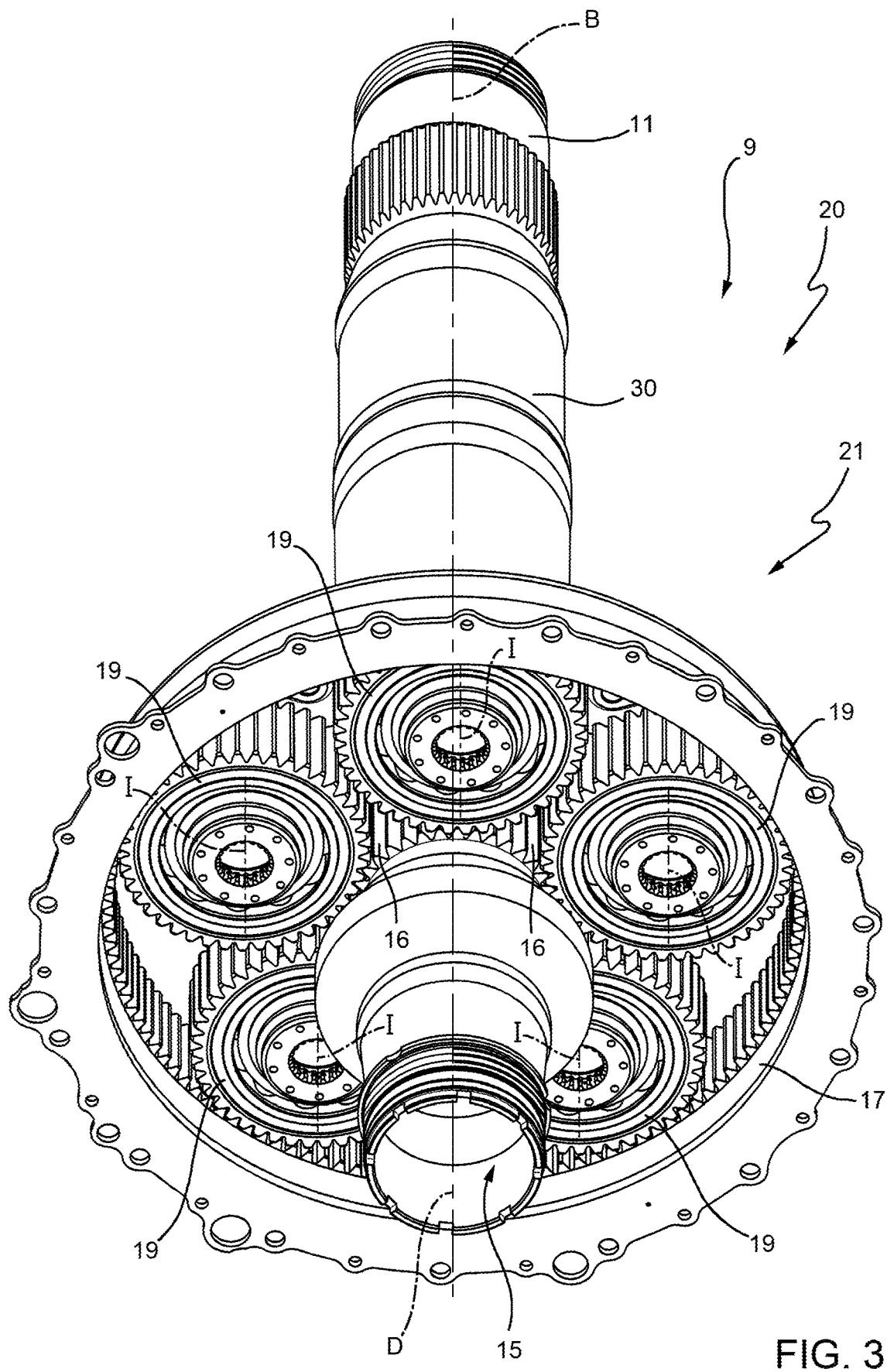
FIG. 3 is a perspective view from below of the transmission in FIG. 2.

With reference to FIG. 1, number 1 denotes an aircraft capable of hovering, in the shown case a convertiplane.

The convertiplane 1 essentially comprises:
a fuselage 2 having an axis A of longitudinal extension;
a pair of half-wings 3 extending cantilevered from respective parts opposite one another of the fuselage 2 and transversely to the axis A;
a pair of nacelles 4 housing relative motors not shown and fixed with respect to the corresponding half-wings 3; and
a pair of rotors 5 operatively connected with respective motors.

The fuselage 2 also comprises a nose 12 arranged at the front and a tail portion 13 that are opposite one another along the axis A.

Each half-wing 3 comprises a free end and opposite to the fuselage 2. The ends of respective half-wings 3 are aligned along an axis E orthogonal to the axis A.

It should be noted that the term "front", "of tail", "longitudinal", "lateral", "above" and "below" and the like used in this description refer to a normal direction of advancement of the convertiplane 1.

In greater detail, each rotor 5 essentially comprises:
a drive shaft 11 rotatable around an axis B;
a hub 7 driven in rotation by the drive shaft 11; and
a plurality of blades 8 articulated on the hub 7.

The rotors 5 are tiltable around an axis C relative to the relative half-wings 3 and the relative nacelles 4.

The axis C is transverse to the axis A and the axes B.
The axis C is also parallel to the axis E.
The convertiplane 1 can be selectively arranged:
in a "helicopter" configuration (visible in FIG. 1), wherein the axes B of the rotors 5 are orthogonal to the axis A and to the axis C; and
in an "airplane" configuration (not shown), wherein the axes B of the rotors 5 are parallel to the axis A and orthogonal to the axis C.

The convertiplane 1 further comprises, for each rotor 5, a main transmission 9 adapted to transmit motion from one or more turbines 10 (only schematically shown) to the drive shaft 11 (only schematically shown in FIG. 1) of the relative rotor 5.

Since the transmissions 9 are identical to each other, reference will be made in the following to a single rotor 5 and to the relative transmission 9.

The transmission 9 further comprises an end stage 20 essentially formed by a planetary gear 21 (FIG. 3), which transmits power to the drive shaft 11 of the rotor 5 with the correct torque and angular speed values.

In the shown case, the planetary gear 21 is a gearbox.

With particular reference to FIG. 3, the planetary gear 21 essentially comprises:
a sun 15 comprising a plurality of teeth 16, rotatable around an axis D and operatively connected to an input shaft (not shown) of the stage 20;

a crown 17 angularly fixed with respect to the axis D; and a plurality of toothed wheels performing the function of respective satellites 19 that are rotatable around respective axes I parallel to the axis D and meshing with the sun 15 and the crown 17.

In the shown case, the crown 17 has a larger diameter than the sun 15.

The axis B is also coincident with the axis D.

The crown 17 surrounds the satellite carrier 30.

The crown 17 is, moreover, carried by a fixed structure only partially shown in the attached Figures.

The planetary gear 21 further comprises a satellite carrier 30 rotatable around the axis B, directly connected to the drive shaft 11 of the rotor 5, and connected to the satellites 19.

In particular, each satellite 19 rotates around its axis I with respect to the satellite carrier 30 and describes a motion of revolution around the axis B integrally with the satellite carrier 30.

Moreover, the mechanical power enters the planetary gear 21 at the sun 15 and exits therefrom, in the direction of the drive shaft 11 of the rotor 5, at the satellite carrier 30, with the correct torque value and number of revolutions.

Figure 4:
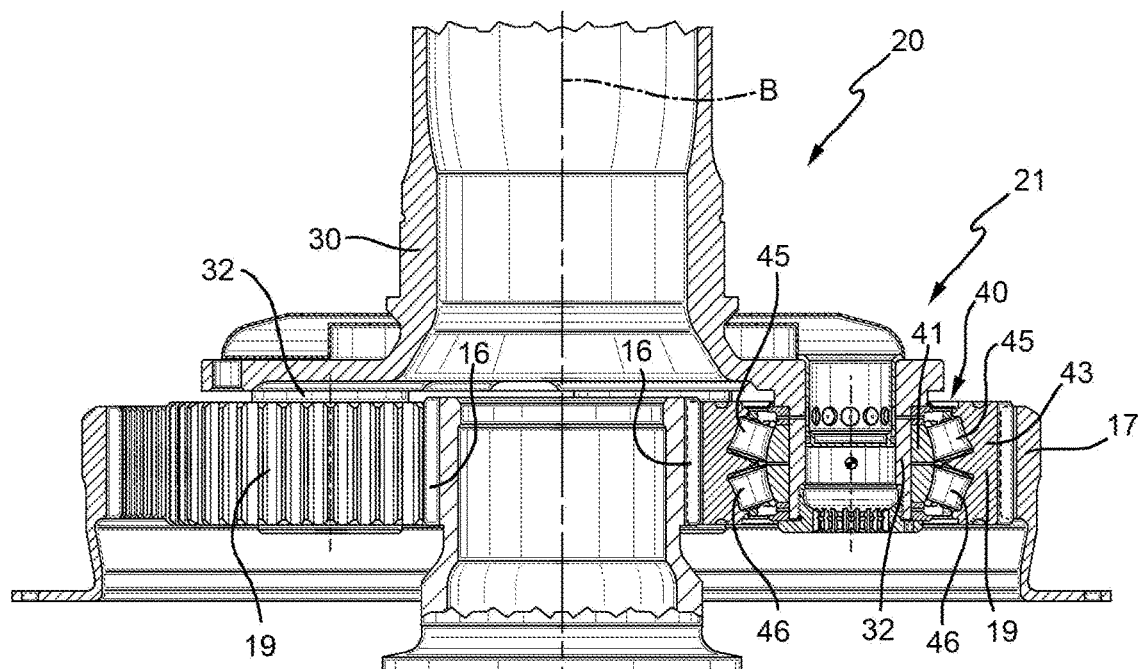
FIG. 4 is a longitudinal section along line IV-IV of FIG. 2 of a transmission of the aircraft of FIG. 1.

In particular, the satellite carrier 30 comprises, in turn (FIG. 4):

a plurality of pins 32 extending along respective axes I and on which respective satellites 19 are rotatably mounted around the respective axes I; and a plurality of rolling bearings 40 radially interposed between respective pins 32 and satellites 19.

In greater detail, each bearing 40 is adapted to support a respective satellite 19 rotatably around a respective axis I on a respective pin 32.

In particular, under nominal conditions, the axis I of each satellite 19 is parallel to axis D of sun 15. However, as will be described in detail in the following, axes I may be inclined with respect to axis D during operation.

In the remainder of this description, a single bearing 40 and the relative pin 32 are described, since all bearings 40 and pins 32 are identical to each other.

The bearing 40 comprises, in turn:

a ring 41 angularly fixed with respect to the pin 32 and defining a raceway 42;

a ring 43 integrally defined by the satellite 19, arranged radially outermost of the ring 41 with respect to the axis I, and defining a pair of raceways 44 facing the raceway 42; and a plurality of rolling bodies 45, 46 rolling on the raceways 42, 44.

Preferably, the bodies 45, 46 are made of steel or ceramic material.

The rolling bodies 45; 46 are arranged angularly equally spaced with respect to the axis I so as to form two respective crowns 47, 48 axially spaced apart between them.

The raceway 42 has partially spherical conformation and the rolling bodies 45, 46 are concave and shaped as a conical hourglass.

Furthermore, bearing 40 is loaded at least by forces oriented radially with respect to axis I. Therefore, as is well known in the art, at a given time, bearing 40 comprises a load zone and a no-load zone. The load zone and the no-load zone extend along respective distinct circular sectors of bearing 40 with respect to axis I.

In particular, the rolling bodies 45, 46 in the load zone are loaded by a radial load, which is due to the radial forces acting on bearing 40; the rolling bodies 45, 46 in the no-load zone are unloaded, i.e. not subject to the radial load. Advantageously, each rolling body 45, 46 is in contact with the raceway 42 at a respective curved line L1, L3 that is open concave on the side of the rolling body 45, 46 (FIGS. 5 and 6); the line L1, L2 comprising first axial ends 61, 63 opposite one another lying on a straight line R1, R3; each rolling body 45, 46 is, moreover, in contact with respective raceways 44 at respective curved lines L2, L4 that are open and convex on the side of the rolling body 45, 46; the lines L2, L4 comprise respective second axial ends 62, 64 lying on a relative straight line R2, R4;

the straight lines R1, R2; R3, R4 are tilted between them, converging in a point S1; S2 lying on an axis H of the rolling body 45, 46 and define an acute angle α1; α2 whose bisector T1; T2 lies on the axis H. In greater detail, the straight lines R1; R3 and the axis I define an acute angle 131; 132 ranging between 10 and 20 degrees, preferably equal to 14 degrees.

In the shown case, the acute angles α1, α2; β1, β2 are equal to each other.

The points S1, S2 of respective crowns 47, 48 are arranged on opposite axial parts of the bearing 40.

Each rolling body 45; 46 comprises, in turn:

a pair of bases 70, 71 axially opposite one another with reference to the relative axis H; and a lateral surface 72 extending between the bases 70, 71.

Bases 71 of respective rolling bodies 45, 46 face one another and are axially interposed parallel to axis I between bases 70 of rolling bodies 45, 46.

The lines L1, L2; L3, L4 of each rolling body 45, 46 comprise a plurality of points included between the respective ends 61, 62; 63, 64 and extending at first decreasing and then increasing distances from the respective axis H, proceeding from the respective base 70 towards the respective base 71.

Figure 8:
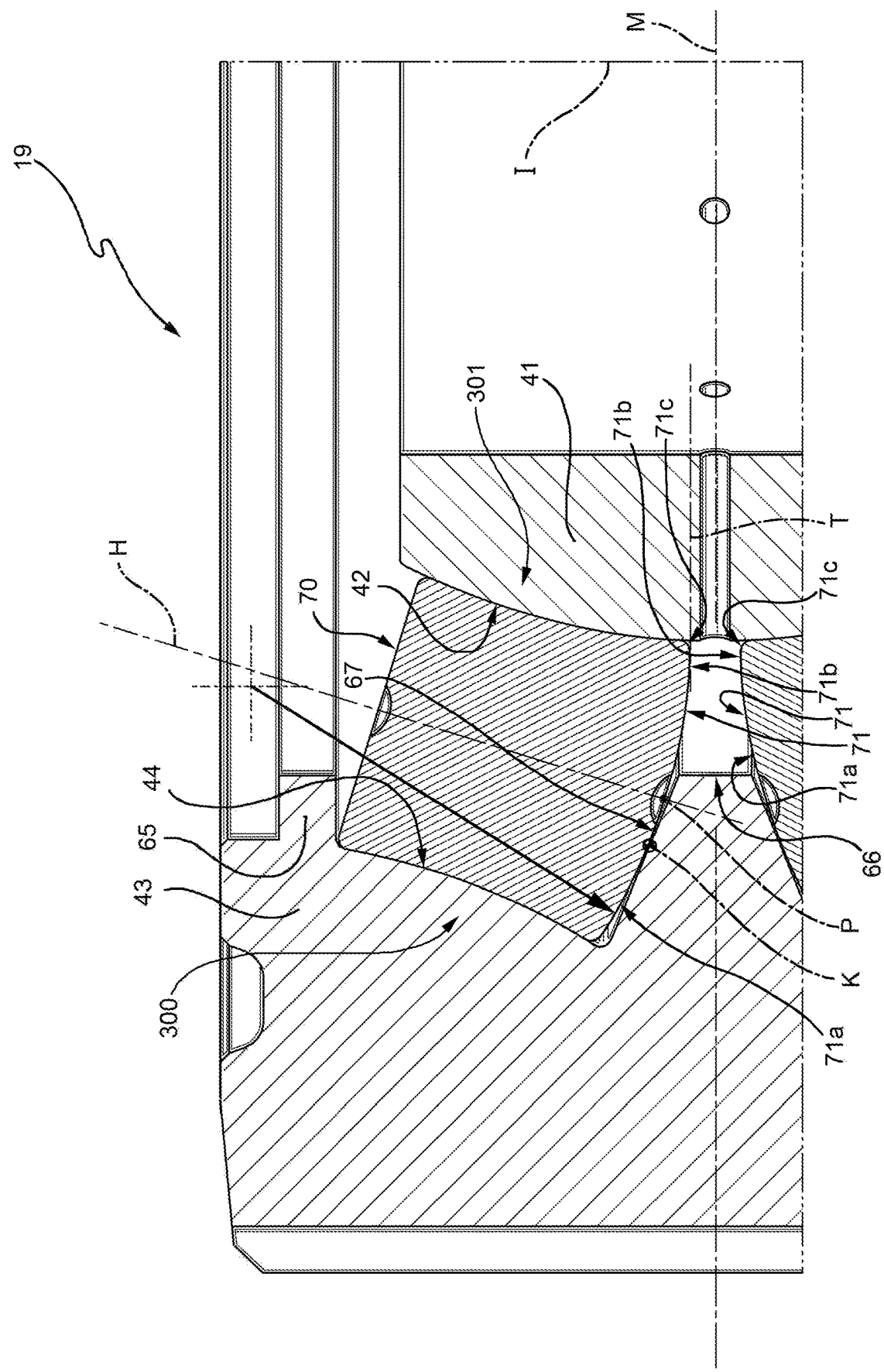
FIG. 8 shows on a greatly enlarged scale a rolling body of a rolling bearing of the transmission of FIGS. 4 to 7.

With particular reference to FIG. 8, the base 70 of each rolling body 45; 46 is orthogonal to the axis H and flat.

The base 71 of each rolling body 45; 46 is shaped as a non-spherical cap generated by the revolution around the relative axis H of a circular segment having its centre on a point K eccentric with respect to the axis H.

The median planes P1, P2 are equidistant from the lines L1, L2; L3, L4, contain the axis H and the bisectors S1, S2 of the relative rolling body 45, 46 and define a plane of symmetry of the rolling body 45; 46 transverse to the bases 70, 71.

Furthermore, rolling bearing 40 comprises a median plane M along its axial extension. Median plane M is orthogonal to axis I.

In detail, proceeding radially from ring 43 to ring 41, each base 71 of each rolling body 45, 46 comprises (FIG. 8):

a stretch 71*a*, the points of which are at progressively decreasing distances from median plane M;

a stretch 71*b*, in which a plane T tangent to base 71 at the points belonging to stretch 71*b* is parallel to median plane M; and a stretch 71*c*, the points of which are at respective progressively increasing distances from median plane M.

In further detail, each stretch 71*b* defines the portion of the respective rolling body 45, 46 arranged at the minimum distance from median plane M.

Furthermore, considering a plane passing through axis H of a rolling body 45, 46 and orthogonal to a diametral plane of rolling bearing 40 passing through axis H, each rolling body 45, 46 comprises at a given time:
  a radially outer half 300 instantaneously on the side of ring 43; and
  a radially inner half 301 instantaneously on the side of ring 41.

In detail, stretch 71a is defined radially along the whole radially outer half 300 and is defined partially along the radially inner half 301. In addition, stretches 71b and 71c are defined radially entirely within the radially inner half 301.

As shown in FIG. 8, point K belongs to stretch 71a.

The ring 41 comprises:
  a pair of axial end elements 51; and
  an element 50 axially interposed between the elements 51 and defining the raceway 42.

Each element 51 comprises, in turn:
  an axially developed portion 55; and
  an axial end portion 56 projecting radially cantilevered from the portion 55.

The ring 41 comprises, a pair of convex surfaces, axially consecutive between them and defining the raceway 42.

In particular, the raceway 42 extends at increasing distances from the axis I from a relative portion 55 of the element 51.

The raceway 42 is axially interposed between portions 56.

The raceway 42 extends axially between the portions 56 and at radial distances from the axis I greater than or equal to the distance of the portions 55 from the axis I.

The maximum distance of the raceway 42 from the axis I is lower than the maximum distance of the portions 56 from the axis I.

Figure 5:
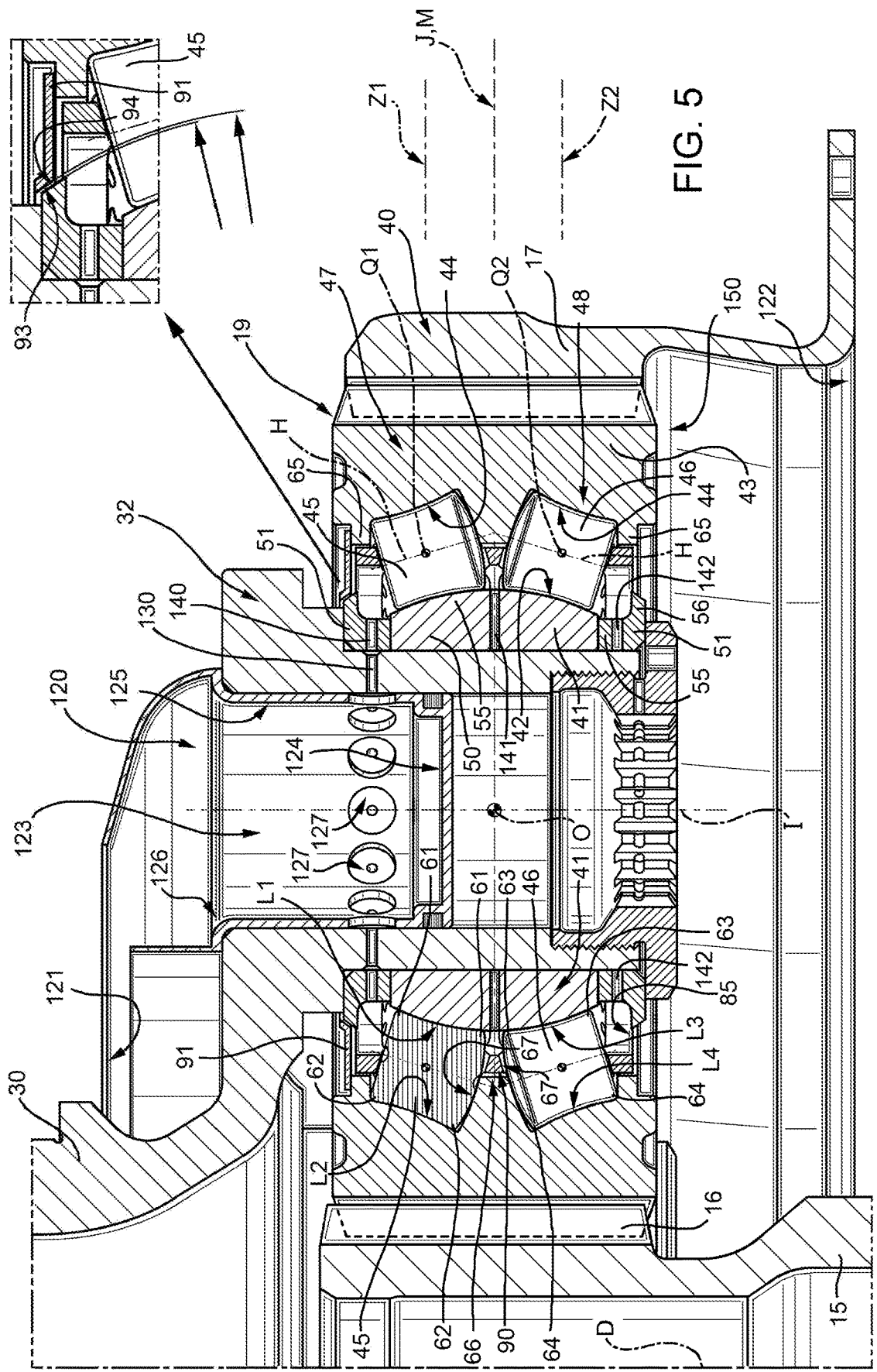
FIG. 5 shows in a further enlarged scale some details of FIG. 4, with parts removed for clarity's sake.

The raceway 42 extends symmetrically with respect to an axis J orthogonal to the axis I, in the shown case (FIG. 5). Therefore, in the embodiment shown, the diameter of raceway 42 corresponding to the maximum radial distance of raceway 42 from axis I lies on median plane M.

The raceway 42 has centre O lying on the axes I, J. The ring 43 comprises, at a position radially internal with respect to the axis I:
  a pair of axial end cage guide 65; and
  an element 66 axially interposed between the raceways 44 and defining a pair of shoulders 67 axially opposite one another.

The element 66 has annular conformation with trapezoidal section tapered towards the axis I, and performs the function of a cage guide exactly like the cage guides 65.

With reference to FIG. 8, preferably the cage guides 65 are axially spaced from the bases 70 of the respective rolling bodies 45; 46.

The shoulders 67 are flat and contact the bases 71 of the respective rolling bodies 45; 46 at respective points K.

The ring 43 further comprises a pair of convex surfaces radially facing the raceway 42 of the ring 41 and defining respective raceways 44.

The raceways 44 are axially interposed between relative cage guides 65 and the element 66, in the shown case.

In the shown case, the ring 43 and the satellite 19 are made in one piece.

Figure 7:
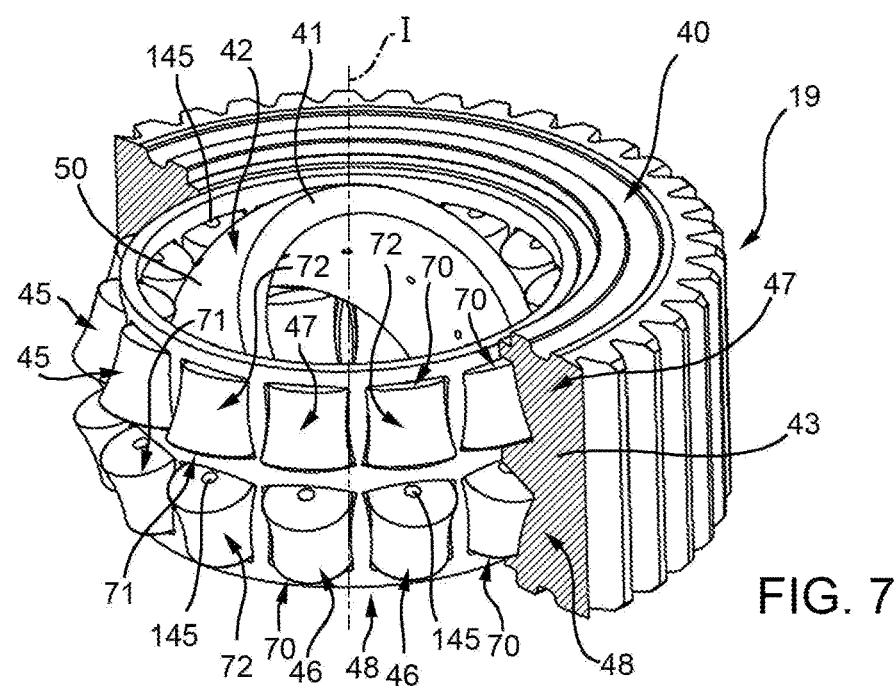
FIG. 7 shows in perspective view the details of FIG. 6, with parts removed for clarity's sake.

The raceways 42, 44 contact the lateral surfaces 72 (FIG. 7) of the relative rolling bodies 45 (46) at the relative closed lines L1 (L2), L3 (L4).

Each rolling body 45, 46 comprises a respective centre Q1, Q2 arranged on the axis H and equidistant parallel to the axis H from intersection points P of the axis H with the respective bases 70, 71.

The centres Q1, Q2 define respective planes Z1, Z2 parallel to each other and orthogonal to the axis I.

The bearing 40 further comprises a cage 90 adapted to keep the rolling bodies 45, 46 of relative crowns 47, 48 separated around the axis I.

Figure 9:
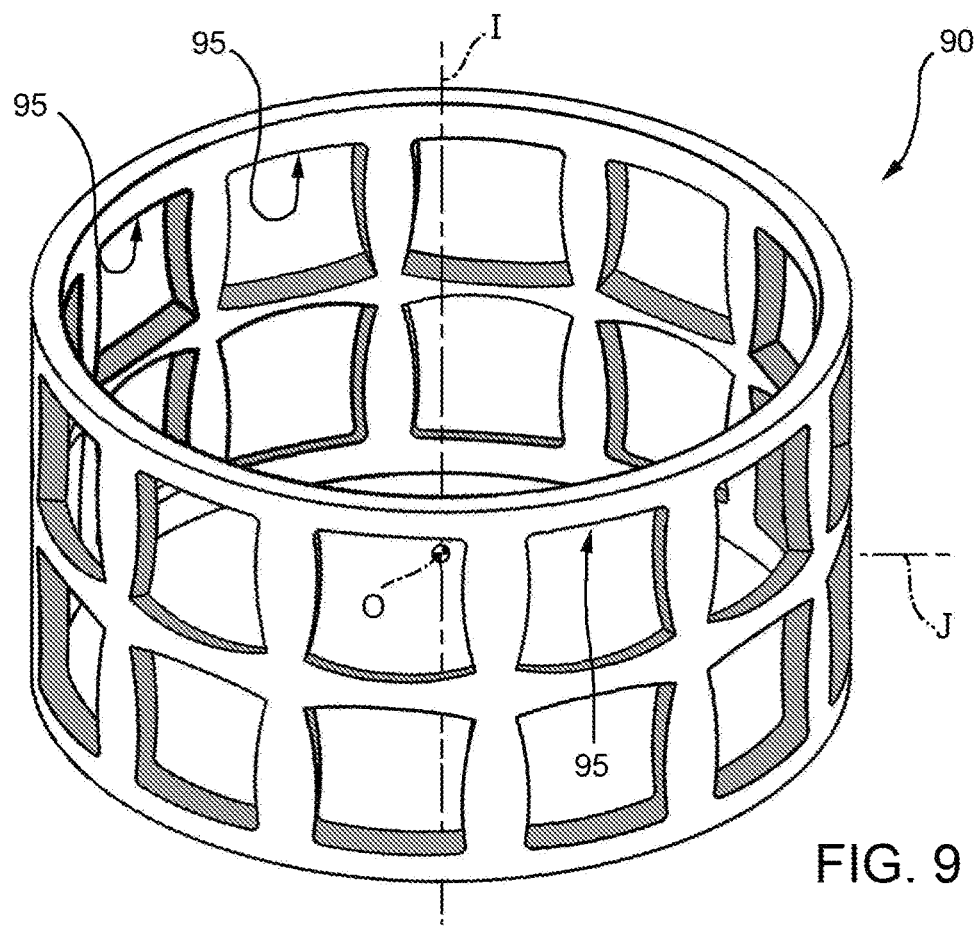
FIG. 9 shows on a greatly enlarged scale a first embodiment of a cage of a rolling bearing of the transmission of FIGS. 4 to 7.

With reference to FIG. 9, the cage 90 is shaped as a ring with a rectangular section in a plane containing the axis I.

The cage 90 comprises a plurality of through alveoli 95 having a conformation corresponding to that of the rolling bodies 45; 46.

The alveoli 95 form two groups axially superimposed on each other. In detail, each alveolus 95 from one of the two groups is aligned to a respective alveolus from the other one of the two groups parallel to axis I (FIG. 9). The alveoli 95 of each group are angularly equally spaced from one another around the axis I.

In particular, the profile of each alveolus 95 is shaped to ensure some clearance with respect to the relative rolling body 45; 46.

In the shown case, the cage 90 is made of steel and/or the alveoli 95 are made by milling.

Figure 10:
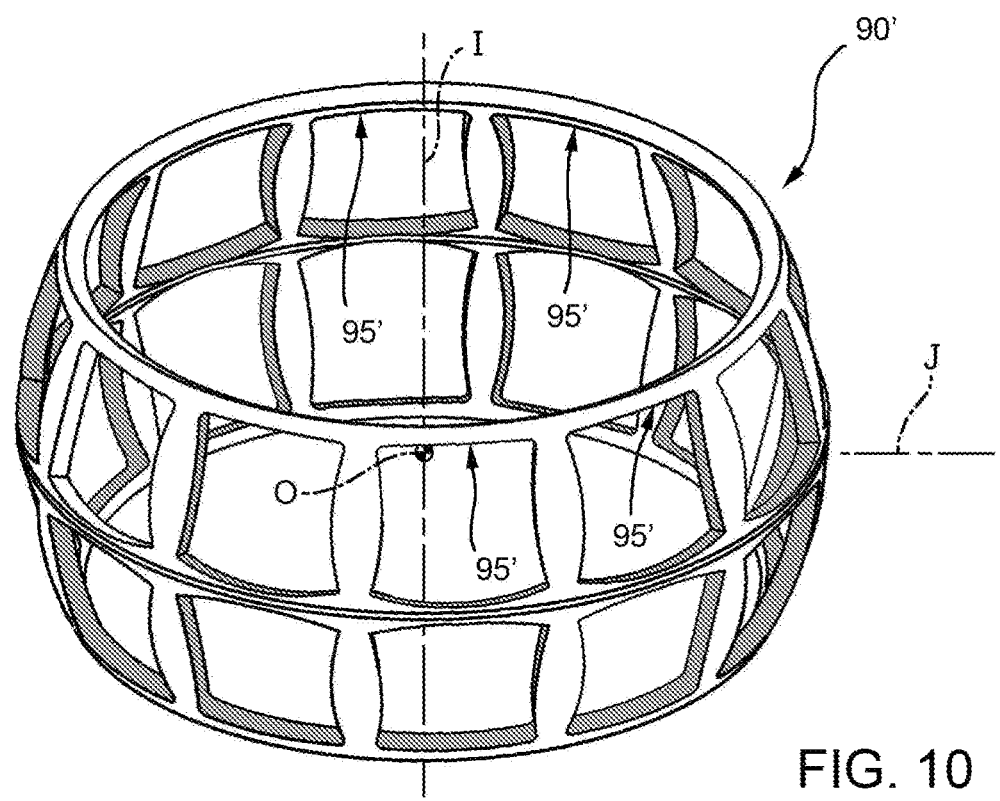
FIG. 10 shows on a greatly enlarged scale a second embodiment of the cage of the rolling bearing of the transmission of FIGS. 4 to 7.

With reference to FIG. 10, a second embodiment of the cage 90 is indicated with 90'.

The cage 90' is similar to the cage 90 and is described below only insofar as it differs from it; similar or equal parts of the cages 90, 90' will be referred to by the same reference numbers.

The cage 90' differs from the cage 90 in that it is shaped as a spherical segment with centre O. The cage 90' is, moreover, made in two pieces symmetrical with respect to the axis J.

The cage 90' is guided only on the raceway 42.

With reference to FIG. 5, the cage guides 65 and the element 66 define respective guide surfaces for the cage 90 so as to keep the centre of gravity of the cage 90 as close to the axis I as possible.

The bearing 40 defines a chamber 85 (FIG. 5) radially bounded by the ring 43 and by the ring 41 and within which the rolling bodies 45, 46 roll.

The planetary gear 21 further comprises a lubrication system 120 of the rolling bodies 45, 46.

Figure 6:
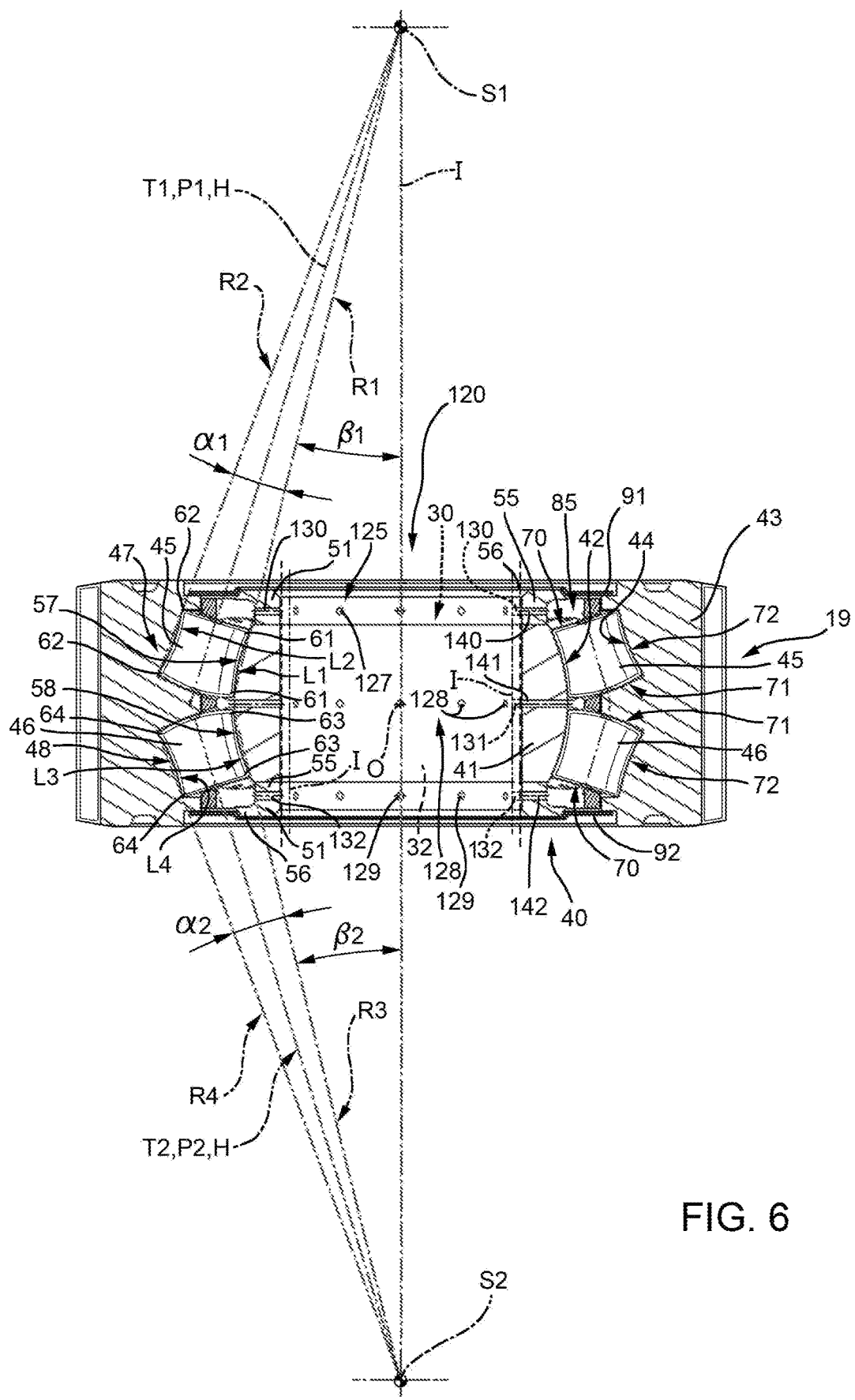
FIG. 6 shows some details of FIG. 5, with parts removed for clarity's sake.

With particular reference to FIGS. 5 and 6, the lubrication system 120 comprises:
  an annular sleeve 121 of axis B, common to all bearings 40 and inside which a lubricating fluid, in particular oil, is supplied from special jets not shown;
  an environment 122 for collecting lubricating fluid that has lubricated the rolling bodies 45, 46 of the bearings 40; and
  a lubricating fluid conveying circuit 123 from the sleeve 121 to the environment 122 and within the chamber 85 so as to allow lubrication of the rolling bodies 45, 46.

In particular, the rolling bearings 45, 46 are interposed along the respective axes I between the sleeve 121 and the environment 122.

In greater detail, the conveying circuit 123 comprises, in turn, for each bearing 40:
  a tubular element 125 for collecting the lubricating fluid coaxially housed within the relative pin 32, provided with an axial end opening 126 in fluidic communication with the sleeve 121, with a closed bottom 124, and with a plurality of circumferential openings 127;
  a plurality of through radial holes 130 defined by the respective pin 32 and arranged at or otherwise in fluidic communication with respective openings 127;

a plurality of through radial holes 140 defined by the ring 41 and in fluidic communication with respective holes 130 and the chamber 85;

a plurality of radial holes 141, 142 defined by ring 41; and an annular opening 150 defined by the rolling bearing 40 by the environment 122 and adapted to fluidically connect the chamber 85 with the environment 122.

The seats 145 are provided for the turning and grinding tailstock.

The openings 127 are angularly equally spaced between them around the axis I.

The openings 127 are in this configuration axially spaced apart from the openings 128 and the openings 129.

It is alternatively possible to nimbly realize variations in the conformation of the lubrication system 120 by shifting the axial positioning of the openings 127 at said openings 128 and 129, in order to realize a different fluidic communication configuration.

The holes 130, 140 (141, 142) are angularly equally spaced between them around the axis I.

The holes 140 are axially spaced apart from the holes 141, which are axially spaced apart from the holes 142.

The holes 140, 141, 142 lie in respective planes parallel to each other and orthogonal to the axis I of the respective pin 32.

The bottom 124 is located, in the case in FIG. 5, axially interposed between the holes 140 and 141, 142.

Consequently, the holes 141, 142 are not supplied by the element 125 with the lubricating fluid.

The bearing 40 further comprises a seal 91 radially interposed between the element 50 of the ring 41 adjacent to the sleeve 121 and the corresponding cage guide 65 of the ring 43. The seal 91 is adapted to retain the lubricating fluid in the chamber 85 (FIG. 5).

The seal 91 and the element 50 have respective end edges 93, 94 facing each other and shaped as portions of spherical surfaces concentric to the raceway 42.

In the embodiment shown in FIG. 6, the element 125 further comprises:

a plurality of openings 128 angularly equally spaced and arranged at respective holes 131 of the pin 32; and a plurality of openings 129 angularly equally spaced and arranged at respective holes 132 of the pin 32.

The openings 127 are axially spaced apart from the openings 128, 129.

The holes 130, 131, 132 (140, 141, 142) are axially spaced apart between them.

The bottom 124 of the element 125 is arranged on the side of the axially opposite wall of the holes 132 with respect to the holes 130, 131.

In this way, the holes 131, 141; 132, 142 are supplied by the element 125 with the lubricating fluid.

In the case shown in FIG. 6, each bearing 40 further comprises a seal 92 axially opposite to the seal 91, radially interposed between the element 50 of the ring 41 adjacent to the environment 122 and the corresponding cage guide 65 of the ring 43. The seal 92 is adapted to retain the lubricating fluid in the chamber 85.

The seal 92 and the element 50 adjacent to the environment 122 are shaped in the same manner as the seal 91 and the element 50 adjacent to the sleeve 121.

In use, the transmission 9 transmits motion from the turbines 10 to the drive shaft 11 of the relative rotor 5.

The power enters the planetary gear 21 through the sun 15, which rotates around the axis D and exits through the satellite carrier 30 connected to the aforesaid drive shaft 11 of the rotor 5.

Thanks to the fact that the satellites 19 also mesh with the fixed crown 17, the rotation of the sun 15 causes the rotation of the satellites 19 around their axes I and the revolution of the satellites 19 around the axis D.

More precisely, the satellites 19 rotate around the relative axes I with respect to the corresponding pins 32 thanks to the bearings 40. In particular, the rolling bodies 45, 46 allow the rotation of the satellites 19 with respect to the pins 32 around the relative axes I.

Moreover, the satellites 19 describe the motion of revolution around the axes B, D integrally with the satellite carrier 30.

The rotation of the satellite carrier 30 transmits power with the appropriate number of revolutions to the drive shaft 11 of the rotor 5.

The operation of the planetary gear 21 is described below limited to a single bearing 40, the relative satellite 19 and the relative pin 32.

During torque transmission from the sun 15 to the satellite carrier 30, the position of the rolling bodies 45, 46 is imposed by the raceways 44 of the ring 43.

The shoulders 67 axially contact the bases 71 of the rolling bodies 45; 46 at respective points K.

The torque transmitted by the sun 15 causes the deflection of the axis I of the pin 32 with respect to the axis D of the sun 15. This deflection causes the ring 41 to deflect, but does not affect the position of the rolling bodies 45, 46 due to the fact that the raceway 42 is shaped as a spherical surface of centre O.

The rolling bodies 45, 46, further roll on the respective raceways 42, 44 substantially without sliding.

More particularly, the planes Z1, Z2 defined by the centres Q1, Q2 of the rolling bodies 45, 46 remain parallel and orthogonal to the axis I, during the transmission of torque from the sun 15 to the satellite carrier 30.

In this way, alternating sliding motions of the rolling bodies 45, 46 are avoided.

In the case shown in FIG. 5, the lubricating oil flows from the sleeve 121 into the element 125 through the opening 126.

Thereafter, the lubricating oil crosses the openings 127, the holes 130 of the pin 32 and the holes 140 of the ring 41 until it reaches the chamber 85.

The lubricating oil flows between the rolling bodies 45, 46 and lubricates the bearing 40.

The lubricating oil is retained within the chamber 85 by the seal 91 and reaches the environment 122 via the opening 150.

Differently, in the embodiment of FIG. 6, the lubricating oil flows from the element 125 to the chamber 85 also through the fluidic paths defined by the:

openings 128, holes 131 of the pin 32 and holes 141 of the ring 41; and openings 129, holes 132 of the pin 32 and holes 142 of the ring 41.

The lubricating oil remains, moreover, trapped in the chamber 85 by the presence of the seals 91, 92.

Figure 11:
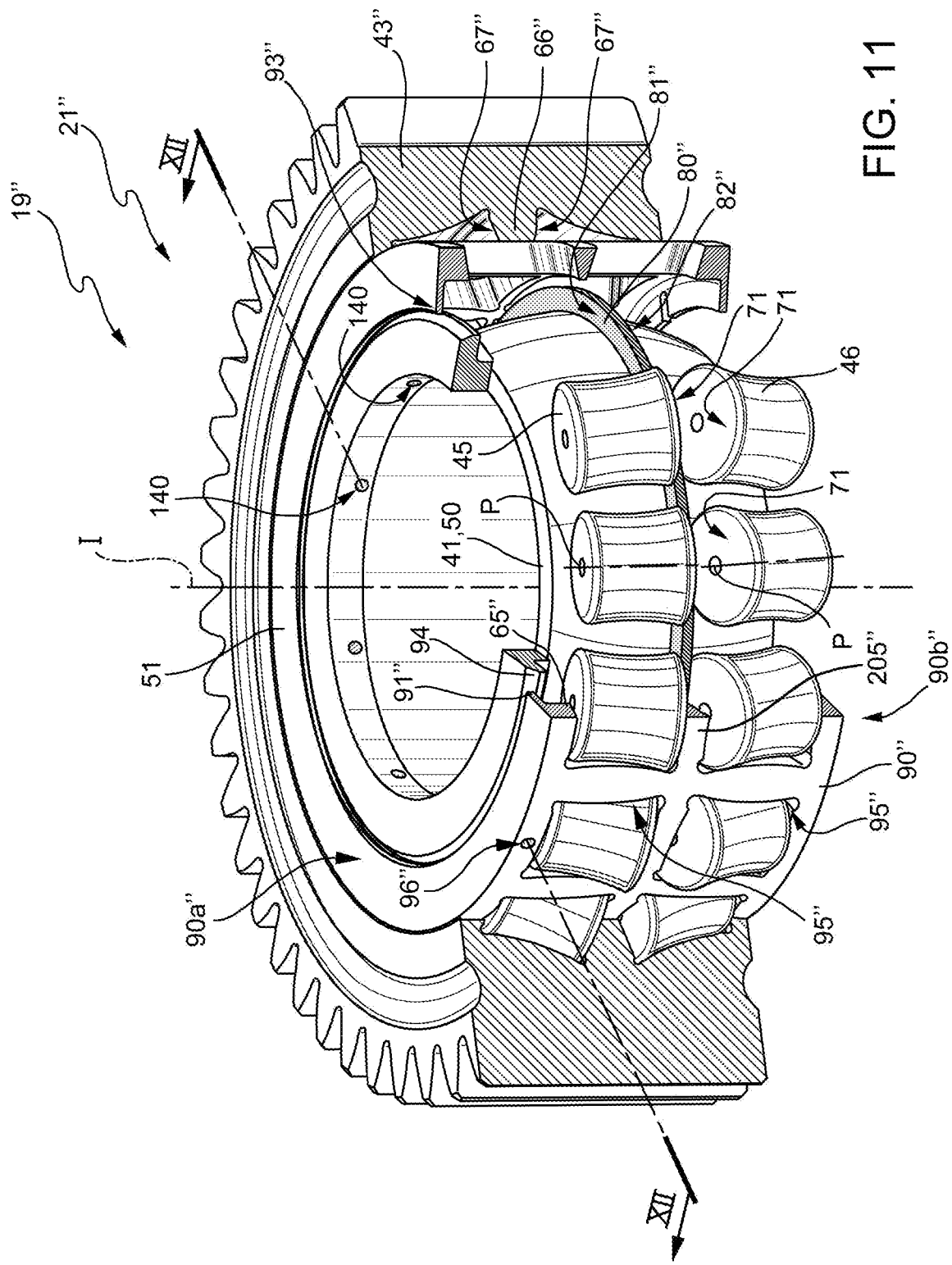
FIG. 11 shows a cutaway perspective view of a portion of a planetary gear realized according to a second embodiment of the present invention.
Figure 12:
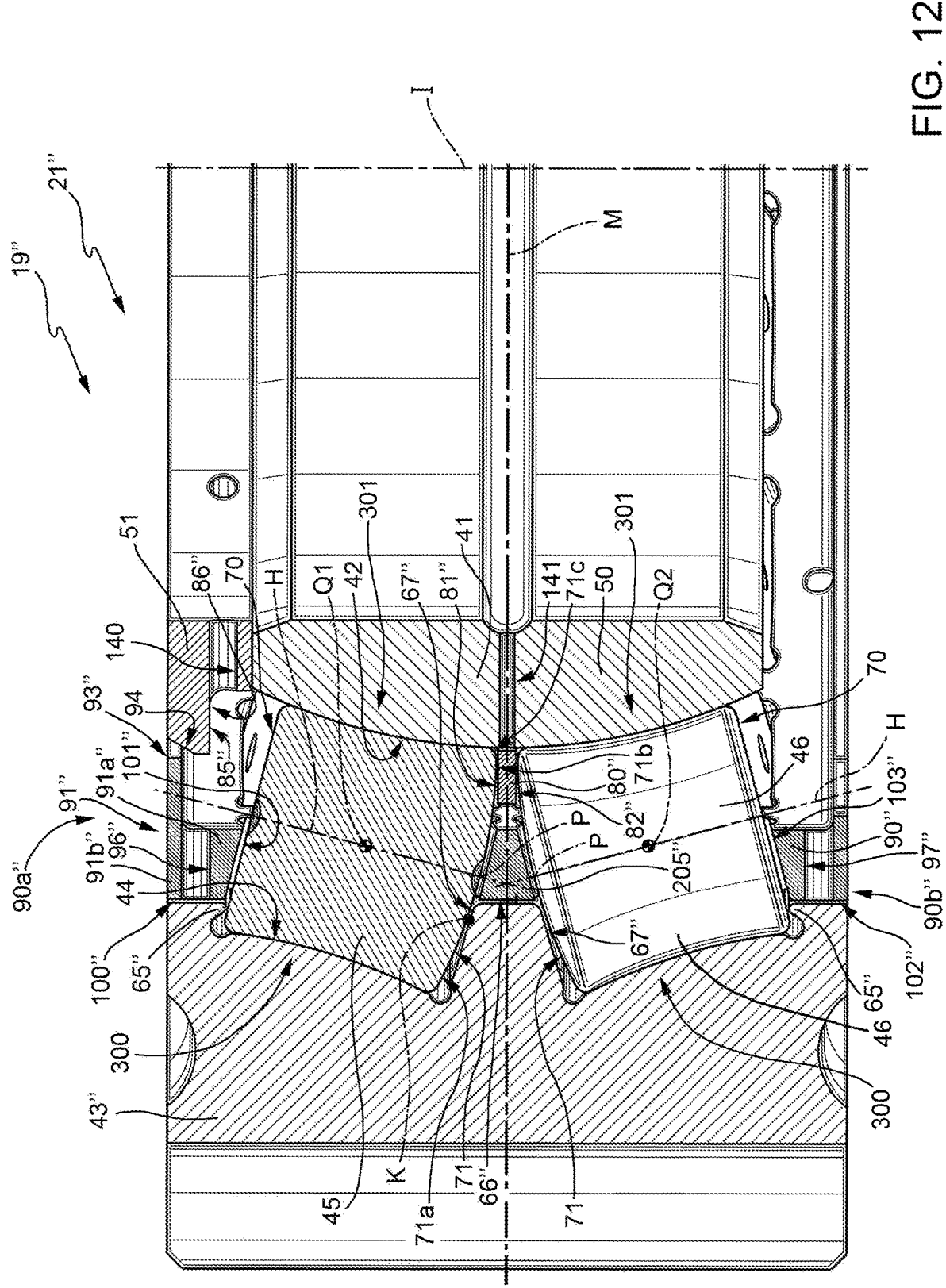
FIG. 12 is an axial section along line XII-XII of FIG. 11 and on an enlarged scale.
Figure 13:
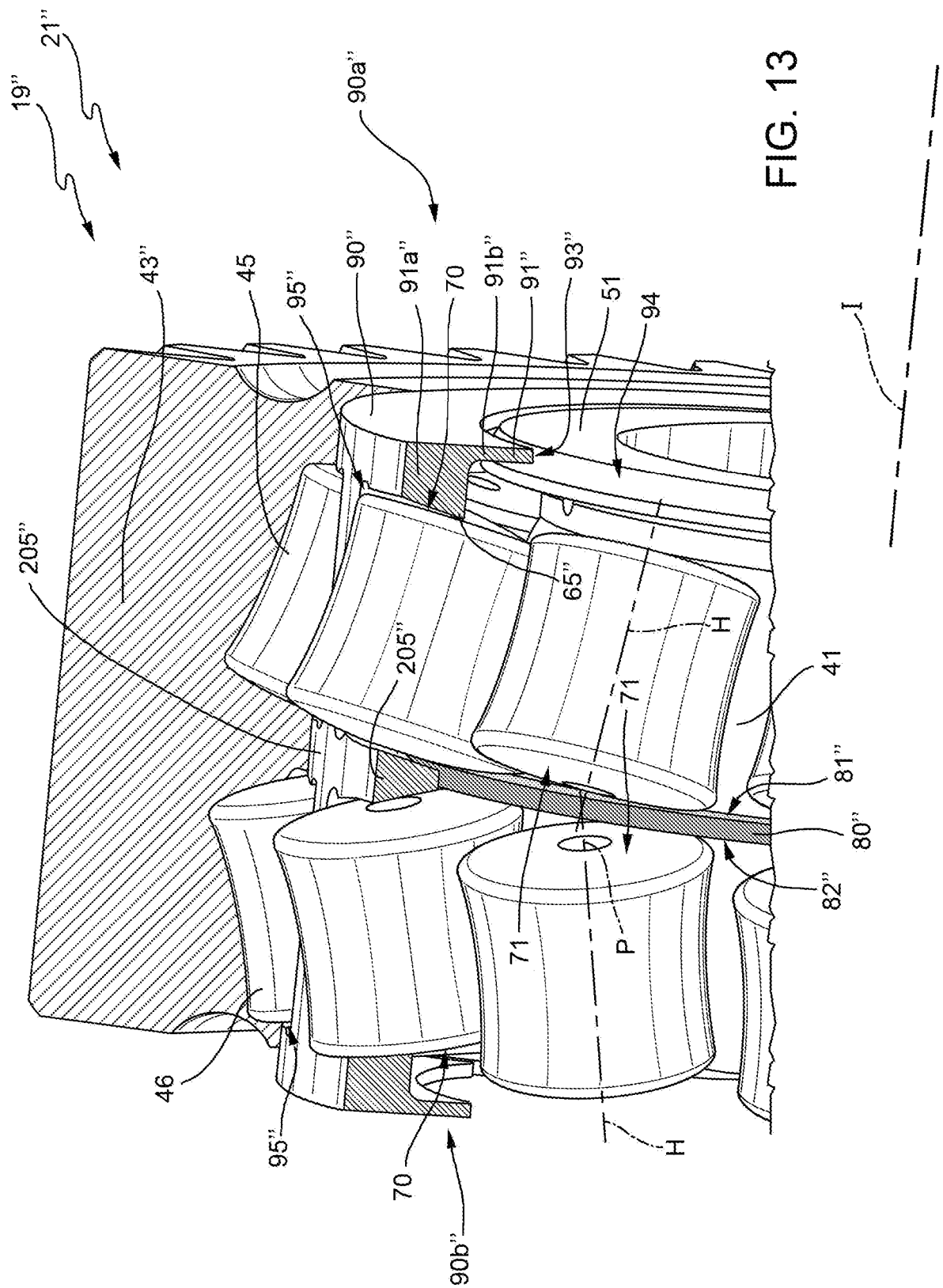
FIG. 13 shows a cutaway perspective detail view of the portion of the planetary gear of FIGS. 11 and 12 on an enlarged scale.

With reference to FIGS. 11 to 13, numeral 21" indicates a planetary gear of transmission 9 of aircraft 1 according to a second embodiment of the present invention.

Planetary gear 21" is similar to planetary gear 21 and will be described hereinafter only as far as it differs therefrom; corresponding or equivalent parts of planetary gears 21, 21" will be indicated where possible by the same reference numerals.

In the remainder of this description, a single bearing 40" will be described, since all bearings 40" are identical to one another.

In particular, planetary gear 21" differs from planetary gear 21 in that each rolling bearing 40" comprises a seal 91", which is integrated in cage 90", differently from seal 91. In addition, cage 90" integrally defines seal 91". In other words, seal 91" and cage 90" form a single piece and are adapted to integrally rotate with respect to axis I (FIG. 12).

Seal 91" is adapted to retain the lubricating fluid contained inside chamber 85", which is radially bounded by ring 43" and ring 41.

In detail, cage 90" comprises:
a main portion 205"; and
seal 91", which is axially joined to main portion 205".

Cage 90" comprises an axial end 90a", which is arranged on the side of rolling bodies 45, and an axial end 90b", which is opposite to axial end 90a" and arranged on the side of rolling bodies 46. In further detail, seal 91" is arranged at axial end 90a" (FIG. 12).

Seal 91" comprises, in turn:
an axially developed portion 91a"; and
a radially developed axial end portion 91b" projecting radially cantilevered from the portion 91a" toward ring 41.

In further detail, seal 91" is joined to main portion 205" at axially developed portion 91a".

Axially developed portion 91a", in turn, is cylindrical and is concentric to main portion 205". In addition, preferably, the radially innermost surface of axially developed portion 91a" is radially aligned with the radially innermost surface of main portion 205".

In addition, radially developed axial end portion 91b" is axially opposite to main portion 205" with respect to axially developed portion 91a".

As shown in FIGS. 11 and 12, cage 90" is radially spaced from ring 43". In addition, cage 90" is also radially spaced from ring 41. In detail, cage 90" is radially closer to ring 43" than to ring 41.

Main portion 205" is similar to cage 90 shown in FIG. 9. In detail, main portion 205" is shaped as a ring having a rectangular section in a plane passing through axis I.

In addition, main portion 205" comprises a plurality of through alveoli 95" having a conformation corresponding to that of the rolling bodies 45; 46.

The alveoli 95" form two groups axially superimposed on each other. In detail, each alveolus 95" from one of the two groups is aligned to a respective alveolus from the other one of the two groups parallel to axis I.

In further detail, alveoli 95" from one of the two groups house respective rolling bodies 45 and alveoli 95" from the other one of the two groups house respective rolling bodies 46.

Cage 90" both axially and radially cooperates with ring 43" through rolling bodies 45, 46. In detail, rolling bodies 45, 46 housed in alveoli 95" are adapted to limit the movement of cage 90" with respect to ring 43" parallel to axis I.

Preferably, cage 90" is made of a not-carburized structural steel.

Furthermore, ring 41 of rolling bearing 40" comprises an axial element 51 and an element 50, which are adjacent along axis I and distinct from each other. In particular, seal 91" and element 51 have respective end edges 93", 94 facing each other.

Seal 91" further comprises a plurality of through radial holes 96", which are adapted to be passed through by the lubricating oil, so as to lubricate at least in part cage 90" and ring 43". In detail, each radial hole 96" is adapted to be passed through by the lubricating oil because of the centrifugal force acting on the lubricating oil during the rotation of rolling bearing 40".

Preferably, radial holes 96" are circular and define respective axes oriented orthogonally to axis D. In addition, radial holes 96" are angularly spaced from one another with respect to axis D.

In the embodiment shown, cage 90" comprises additional through radial holes 97" having a similar function as radial holes 96". In detail, holes 97" are circular and have respective axes oriented orthogonally to axis D.

Preferably, radial holes 97" are axially opposite to radial holes 96" with respect to median plane M. However, radial holes 97" might be formed at a different axial position of cage 90".

In detail, radial holes 97" are adapted to be passed through by the lubricating oil so as to lubricate cage 90" and ring 43" in proximity to axial end 90b".

Furthermore, chamber 85" comprises a portion 86", which is radially bounded by ring 41 and cage 90".

More specifically, rolling bearing 40" comprises (FIG. 12):
an interstice 100", which extends radially between ring 43" and seal 91" and axially between axial end 90a" and bases 70 of respective rolling bodies 45; and
an interstice 101", which extends radially between the radial innermost surface of ring 43 and the radial innermost surface of axially developed portion 91a" and axially between seal 91" and bases 70 of respective rolling bodies 45.

Interstices 100" and 101" are fluidly connected to each other and to radial holes 96". In addition, radial holes 96" fluidly connects portion 86" to interstices 100" and 101".

In detail, interstice 101" is directed orthogonally to axis H of rolling bodies 45.

The lubricating oil that has crossed radial hole 96" in the radial direction oriented from ring 41 to ring 43" is adapted to flow across interstice 100" along the axial direction oriented from axial end 90a" towards axial end 90b". In addition, the lubricating oil is adapted to drain through interstice 101" along a direction perpendicular to axis H of rolling bodies 45 and oriented from ring 43 to ring 41.

Rolling bearing 40" further comprises:
an interstice 102", which extends radially between ring 43" and cage 90" and axially between axial end 90b" and bases 70 of respective rolling bodies 46; and
an interstice 103", which extends radially between the radially innermost surface of ring 43" and the radial innermost surface of cage 90" and axially between cage 90" and bases 70 of respective rolling bodies 46.

Interstices 102" and 103" are fluidly connected to each other and to radial holes 97". In addition, radial holes 97" fluidly connect portion 86" to interstices 102" and 103".

In detail, interstice 103" is directed orthogonally to axis H of rolling bodies 46.

The lubricating oil that has crossed radial hole 97" in the radial direction oriented from ring 41 to ring 43 is adapted to flow across interstice 102" along the axial direction oriented from axial end 90b" towards axial end 90a". In addition, the lubricating oil is adapted to drain through interstice 103" along a direction perpendicular to axis H of rolling bodies 46 and oriented from ring 43 to ring 41.

According to a not-shown alternative embodiment, planetary gear 21" comprises a further seal, which is identical to seal 91", is integrated in cage 90" and is arranged at axial end 90*b*". In detail, cage 90" according to this not-shown alternative embodiment integrally defines both seal 91" and the further seal.

The further seal comprises a plurality of through radial holes identical to through holes 96" and which are axially opposite to through holes 96" with respect to median plane M.

According to this alternative embodiment, planetary gear 21 comprises a further element 51 axially opposite to the element 51 facing seal 91". In detail, this further element 51 faces the further seal.

In particular, rolling bearing 40" comprising seal 91" and not also the further seal (as shown in FIG. 12) allows the lubricating oil to be efficiently discharged toward environment 122. In addition, the rolling bearing 40" according to the embodiment shown in FIG. 12 allows any possible metallic chips contained in chamber 85" to be discharged and to efficiently flow towards a not-shown chip detector arranged downstream of chamber 85". In detail, the not-shown chip detector is adapted to detect the presence of metallic chips in the lubricating oil discharged from rolling bearing 40", so as to trigger maintenance operations.

On the other hand, rolling bearing 40" according to the not-shown embodiment (i.e. comprising both seal 91" and the not-shown further seal) is characterized by an efficient lubrication of the parts housed inside chamber 85".

Planetary gear 21 also differs from planetary gear 21 in that each rolling bearing 40" comprises an annular element 80", which is unconstrained with respect to rings 41 and 43". Annular element 80" is arranged between rings 41 and 43" radially with respect to axis I and between rolling bodies 45 and 46 axially with respect to axis I (FIG. 12).

Annular element 80" allows the pressure distribution between rolling bodies 45, 46 and ring 41 and the pressure distribution between rolling bodies 45, 46 and ring 43" to be homogenized. In detail, different geometrical shapes of annular element 80" correspond to respective different pressure distributions between rolling bodies 45, 46 and ring 41 and between rolling bodies 45, 46 and ring 43".

Annular element 80" has the shape of a circular annulus and is fitted around the entire circumferential extension of ring 41. In detail, since annular element 80" is unconstrained, it is free to rotate relative to ring 41.

Preferably, annular element 80" is a tail washer and is made of bearing steel.

In addition, as will be described in detail in the following, annular element 80" is axially stationary with respect to ring 41 along axis I. It is important to stress that annular element 80" is stationary along axis I due to the axially balanced loading conditions to which it is subjected. Annular element 80" is not connected to a component of rolling bearing 40" that is stationary with respect to axis I (by way of example, ring 41).

Preferably, as shown in FIG. 12, considering the intersection points P of axis H of each rolling body 45, 46 and respective bases 71, annular element 80" is completely radially arranged between intersection points P and raceway 42. In detail, annular element 80" is radially arranged on the side of the radially inner half 301 of rolling bodies 45, 46. Moreover, as shown in FIG. 12, annular element 80" is radially spaced from cage 90".

Furthermore, annular element 80" comprises two surfaces 81", 82", which are flat and opposite to each other along axis I. Surfaces 81" and 82" face respectively rolling bodies 45 and 46. In addition, preferably, annular element 80" has a rectangular section in a plane passing through axis I.

In particular, each flat surface 81", 82" is in contact with respective bases 71 at respective stretches 71*b*. As a result, rolling bodies 45 and 46 exert on annular element 80" respective contact forces (at surfaces 81" and 82"), which are directed parallel to axis I. In detail, rolling bodies 45 and 46 do not exert contact forces directed radially with respect to axis I on annular element 80". In further detail, the contact forces exerted by rolling bodies 45 and 46 are correlated to the axial load transferred by rolling bearing 40".

Furthermore, rolling bodies 45 and 46 are in direct contact with annular element 80". In detail, each flat surface 81", 82" and the respective base 71 facing the flat surface 81", 82" itself are in direct contact and define respective contact regions, which lie on respective planes orthogonal to axis I.

In addition, the contact forces exerted by rolling bodies 45 and 46 are constantly mutually balanced along axis I. In other words, in every moment each contact force exerted by a rolling body 45 on flat surface 81" is equal in magnitude to the contact force exerted by a rolling body 46 on flat surface 82" parallel to axis I.

This is due to the fact that since rolling bodies 45, 46 are housed in respective alveoli 95" of cage 90", each rolling body 45 is constantly aligned to a respective rolling body 46 parallel to axis I.

As a result of the contact forces exerted by rolling bodies 45, 46 on annular element 80", annular element 80" is adapted to exert reaction forces on rolling bodies 45 and 46, which are oriented parallel to Moreover, surfaces 81" and 82" are constantly orthogonal to axis I. This is due to the fact that in every moment, contact forces exerted by rolling bodies 45 and 46 on annular element 80" are mutually balanced parallel to axis I.

Rolling bodies 45, 46 and annular element 80" are adapted to roll on one another without substantial slip. In particular, rolling elements 45, 46 are adapted to revolute around axis I and, as a result, annular element 80" is adapted to rotate about axis I.

More specifically, rolling bodies 45, 46 and annular element 80" exchange friction forces with one another, which are due to static friction between surfaces 81', 82" and respective bases 71. In detail, the friction forces are directed tangentially to the circumferential direction of annular element 80". In addition, the friction forces exerted by rolling bodies 45, 46 on annular element 80" drive annular element 80" in rotation about axis I.

Furthermore, on the one hand, a point of stretch 71*b* of each rolling body 45, 46 has a tangential speed, which depends on the speed of the center of mass of the rolling body 45, 46, on the radial distance between the point itself and the center of mass and by the angular speed of the rolling body 45, 46 about the relative axis H. On the other hand, a point of surfaces 81", 82" belonging to the respective contact region with rolling bodies 45 or 46 has a tangential speed that depends on the radial distance between the point itself and axis I and by the angular speed of annular element 80" about axis I.

Considering a theoretical condition in which annular element 80" and rolling bodies 45, 46 are infinitely rigid, the tangential speed of the point of stretch 71*b* and the tangential speed of the point of surfaces 81" or 82" belonging to the contact region are equal to each other. As a result, the relative tangential speed between the two points is null and the slippage between rolling bodies 45, 46 and annular element 80" is null.

However, since annular element 80" and rolling bodies 45, 46 are not infinitely rigid, the contact area is not just a point, but it has a finite extension. Therefore, the tangential speeds of the points of annular element 80" and rolling bodies 45, 46 belonging to the contact region slightly differ. Therefore, the slippage of rolling bodies 45, 46 on annular element 80" is not null, but is proportional to the relative tangential speed between rolling bodies 45, 46 and annular element 80" at respective points belonging to the contact region. More specifically, the points of annular element 80" belonging to the contact region have respective different tangential speeds and the mean value of these tangential speeds is correlated to the angular speed of annular element 80" about axis I.

Furthermore, annular element 80", and in particular surfaces 81", 82", define a third raceway for rolling bodies 45, 46.

In other words, rolling bodies 45 are adapted to roll on raceways 42, 44 and 81" at the same time; rolling bodies 46 are adapted to roll on raceways 42, 44 and 82" at the same time. In detail, raceways 42, 44 and 81", 82" may have respective different angular speeds.

In addition, preferably, rolling bodies 45, 46 are not in contact with element 66", and in particular with respective shoulders 67".

Preferably, annular element 80" is arranged parallel to the axis I at radial bore 141 (FIG. 12). This allows the regions radially arranged between annular element 80" and ring 41 to be lubricated and to limit heat generation due to any possible sliding between annular element 80" and ring 41.

According to a not-shown embodiment, raceway 42 may still have an at least partially spherical conformation, but the diameter of raceway 42 corresponding to the maximum distance from axis I may lay on a plane that is distanced from median plane M. This allows the pressure distribution between rolling bodies 45, 46 and ring 41 and the pressure distribution between rolling bodies 45, 46 and ring 43" to be modified with respect to a condition in which the diameter of raceway 42 corresponding to the maximum distance from axis I lies on median plane M.

Planetary gear 21" further differs from planetary gear 21 in that the ring 43" of each rolling bearing 40" comprises, at a position radially internal with respect to the axis I a pair of end shoulders 65", which are adapted to axially cooperate with bases 70 of rolling bodies 45 and 46 (FIG. 12).

In detail, ring 43" comprises two shoulders 65", which are opposite to each other with respect to median plane M. In addition, each shoulder 65" is arranged in proximity to a respective axial end of ring 43" along axis D and extends around the entire circumferential extension of ring 43".

In further detail, shoulders 65" are arranged at the radially innermost diameter of ring 43" and axially protrude towards rolling bodies 45, 46.

Preferably, the shoulder 65" on the side of rolling bodies 45 is adjacent to the axial end of raceway 44 on the side of axial end 90a"; the shoulder 65" on the side of rolling bodies 46 is adjacent to the axial end of raceway 44 on the side of axial end 90b".

Shoulders 65" directly contact bases 70 of the respective rolling bodies 45, 46 and are adapted to limit the movement of rolling bodies 45 and 46 away from respective raceways 44. Preferably, as shown in FIG. 12, shoulders 65" are hook-shaped in a plane passing through axis I.

Shoulders 65" are adapted to limit the skew angle of rolling bodies 45, 46 when rolling bodies 45, 46 are unloaded, i.e. not subjected to the radial load.

As is well known in the art, the skew angle of a rolling body is the angle corresponding to the misalignment between the actual axis H of the rolling body and the theoretical axis H of the rolling body under design conditions.

In particular, shoulders 65" are adapted to limit the variation of the skew angle of rolling bodies 45, 46 when rolling bodies 45, 46 transition from the no-load zone to the load zone.

In fact, when rolling bodies 45, 46 transition from the no-load zone to the load zone, the actual axes H of rolling bodies 45, 46 tend to realign with their respective theoretical axes under design conditions, by virtue of the shape of rolling bodies 45, 46 and raceway 42.

In detail, the realignment of the actual axis H of each rolling body 45, 46 with the respective theoretical axis under design conditions may cause rolling bodies 45, 46 to be subjected to high re-alignment accelerations.

Therefore, shoulders 65" are also adapted to limit the re-alignment accelerations of rolling bodies 45, 46 when rolling bodies 45, 46 transition from the no-load zone to the load zone or vice versa.

Furthermore, shoulder 65" on the side of axial end 90a" radially delimits interstices 100" and 101". In addition, interstice 100" and interstice 101" join at shoulder 65" (FIG. 12).

Shoulder 65" on the side of axial end 90b" radially delimits interstices 102" and 103". In addition, interstice 102" and interstice 103" join at shoulder 65".

Ring 43" also comprises an element 66", which is similar to element 66.

Element 66" is axially interposed between end shoulders 65" and defines a pair of shoulders 67", which are flat and axially opposite one another with respect to median plane M.

Element 66" has an annular conformation with a trapezoidal section tapered towards the axis I, and performs the function of a cage guide.

As shown in FIG. 12, element 66" extends radially from the raceways 44 towards axis I past points K and is radially distanced from the intersection points P. In other words, element 66" is completely arranged on the side of the radially outer half 300 of rolling bodies 45, 46. Furthermore, the radial innermost portion of shoulders 65" is radially aligned with the radially innermost portion of element 66".

In addition, cage 90" extends from a first radial position, which is radially external with respect to intersection points P and radially internal with respect to point K, to a second radial position, which is radially internal with respect to intersection points P. In other words, cage 90" extends radially partially on the side of the radially outer half 300 and partially on the side of the radially inner half 301 of rolling bodies 45, 46.

The operation of the planetary gear 21" is similar to the operation of planetary gear 21 and will be described hereinafter only as far as it differs therefrom. In addition, the operation of planetary gear 21" is described below limited to a single bearing 40", the relative satellite 19" and the relative pin 32.

During torque transmission from the sun 15 to the satellite carrier 30, the position of the rolling bodies 45, 46 is imposed by the raceways 44 of the ring 43" and by shoulders 65", which axially contact the respective bases 70 of the rolling bodies 45; 46.

Furthermore, rolling bodies 45, 46, roll on the respective raceways 42, 44 and on annular element 80" substantially without sliding. In particular, the friction forces exchanged between rolling bodies 45, 46 and annular element 80" cause annular element 80" itself to rotate about axis I. Therefore, the relative tangential speed between points of annular element 80" and rolling bodies 45, 46 belonging to the contact region is null or substantially null.

Furthermore, rolling bodies 45, 46 exert on annular element 80" respective contact forces. In detail, since rolling bodies 45, 46 contact annular element 80" at stretch 71b, at which tangent plane T is parallel to median plane M, the contact forces are directed parallel to axis I.

At the same time, since rolling bodies 45, 46 are housed in respective alveoli 95" of cage 90", which are each arranged in two groups of alveoli aligned to one another parallel to axis I, each rolling body 45 is constantly aligned to a respective rolling body 46 parallel to axis I and contact forces are mutually balanced parallel to axis I.

When rolling bodies 45, 46 are in the no-load zone, shoulders 65" contacting bases 70 limit the skew angle of rolling bodies 45, 46. In addition, when rolling bearing 40" transitions from the no-load zone to the load zone, shoulders 65" limit the variation of the skew angle of rolling bodies 45, 46 and thereby limit the re-alignment accelerations acting on rolling bodies 45, 46.

During the rotation of the satellite 19", seal 91" rotates integrally with cage 90" and retains the lubricating oil contained in chamber 85.

In addition, the retained lubricating oil crosses cage 90" through holes 96" and/or 97" and lubricates the region of cage 90" facing ring 43".

In particular, the lubricating oil crosses holes 96" in the radial direction oriented from ring 41 towards ring 43" and reaches interstice 100". The lubricating oil then flows across interstice 100" along the axial direction oriented from axial end 90a" towards axial end 90b" and is discharged through interstice 101" along a direction perpendicular to axis H of rolling bodies 45 and oriented from ring 43 to ring 41.

In addition, the lubricating oil crosses holes 97" in the radial direction oriented from ring 41 towards ring 43" and reaches interstice 102". The lubricating oil then flows across interstice 102" along the axial direction oriented from axial end 90b" towards axial end 90a" and is discharged through interstice 103" along a direction perpendicular to axis H of rolling bodies 46 and oriented from ring 43 to ring 41.

In the not-shown embodiment wherein planetary gear 21" comprises the further seal, the lubricating oil passes through the hole of the further seal as well.

From an examination of the planetary gear 21; 21" according to the present invention, the advantages that it allows obtaining are evident.

In particular, the rolling bodies 45, 46 of each rolling bearing 40; 40" are concave, shaped as an hourglass, and are in contact with the raceway 42 (44) at the curved line L1, L2 (L3, L4).

The straight lines R1, R2 (R3, R4) on which the axial ends 61, 62 (63, 64) of the lines L1, L2 (L3, L4) of each rolling body 45, 46 lie converge in a point S1 (S2) lying on the axis H of the rolling body 45, 46 and on the axis I. The bisector T1 (T2) of the angle α1 (α2) between the straight lines R1, R2 (R3, R4) lies in the plane P1 (P2).

In this way, any sliding of the rolling bodies 45, 46 on the raceways 42, 44 can be substantially reduced. This is because the rolling bodies 45, 46 and the raceways 42, 44 approximate Poinsot cones.

Moreover, the planes Z1, Z2 defined by the centres Q1, Q2 of the rolling bodies 45, 46 remain parallel and orthogonal to the axis I, during the transmission of torque from the sun 15 to the satellite carrier 30.

In this way, the alternating sliding motions of the rolling bodies 45, 46 and the consequent worsening phenomena of the service life of the planetary gear 21 are avoided, unlike the solutions known and commented on in the introductory part of the present description.

The cage 90; 90" of each bearing 40; 40" is guided by the cage guides 65 and/or the element 66; 66" in its rotation around the relative axis I.

In this way, it is possible to keep the centre of gravity of the cage 90; 90" as much as possible at the axis I, so as to avoid dynamic unbalancing of the cage 90".

The base 71 of each rolling body 45, 46 is shaped as a spherical cap generated by the revolution around the respective axis H of a circular segment having a respective centre at the point K in an eccentric position with respect to the aforesaid axis H.

The base 71 of each rolling body 45, 46 contacts the shoulder 67 at the relative centre at point K.

In this way, it is possible to limit the contact areas between flat shoulder 67 and respective curved bases 71 of respective rolling bodies 45; 46, and to decide the position of the aforesaid contact areas on the shoulder 71.

The lubrication system 120 ensures that the lubricating oil laps the rolling bodies 45, 46, substantially reducing any risk of seizure.

Furthermore, the ring 43" of each rolling bearing 40" comprises end shoulders 65" adapted to axially cooperate with bases 70 of respective rolling bodies 45, 46. This allows the skew angle of rolling bodies 45, 46 in the no-load zone to be limited and to avoid undesired re-alignment accelerations of rolling bodies 45, 46 when rolling bodies 45, 46 transition from the no-load zone to the load zone or vice versa.

Rolling bearing 40" comprises annular element 80", which is unconstrained. As a result, the pressure distributions between rolling bodies 45, 46 and ring 41 and between rolling bodies 45, 46 and ring 43" can be homogenised without this introducing slippage and heat generation.

More specifically, since bases 70 have a different shape than bases 71, rolling bodies 45, 46 are not symmetrical with respect to a median plane orthogonal to axis H. Therefore, in a rolling bearing 40" without annular element 80", the pressure distribution between rolling bodies 45, 46 and ring 41 and the pressure distribution between rolling bodies 45, 46 and ring 43" are in general not symmetrical either. In addition, in a rolling bearing 40" without annular element 80" and without element 66", these pressure distributions depend on the curvature of rolling bodies 45, 46 and rings 41, 43" at respective contact regions and on the fact that the rolling bodies 45, 46 are movable along axis I and are not homogenized in general.

In particular, annular element 80" allows the maximum value of pressure in the pressure distribution between rolling bodies 45, 46 and ring 41 to be located in close proximity to the geometrical barycentre of the contact area between respective rolling bodies 45, 46 and ring 41. At the same time, annular element 80" allows the maximum value of pressure in the pressure distribution between rolling bodies 45, 46 and ring 43" to be located in close proximity to the geometrical barycentre of the contact area between respective rolling bodies 45, 46 and ring 43".

Still for the fact that annular element 80" is unconstrained, and in particular it is not integral with ring 41, even relevant angular inclinations between axis I and axis D are allowable without substantial slippage of the rolling bodies 45, 46 on the raceways 42, 44.

Moreover, since annular element 80" is unconstrained and rotates about axis I, the relative tangential speed between each rolling body 45, 46 and annular element 80" at each respective contact region is substantially null and the sliding is minimized. In greater detail, the sliding between rolling body 45, 46 and annular element 80"—even in real condition—is much lower than the sliding that would be generated between a rolling body 45, 46 and any other body having a speed different than the tangential speed of the rolling body at the contact region (by way of example, ring 43).

Furthermore, the shape of rolling bodies 45, 46 is such that plane T tangent to basis 71 at the points belonging to stretch 71*b* is parallel to median plane M. In addition, surfaces 81", 82" are in contact with respective bases 71 at respective stretches 71*b*. In this way, the contact forces exerted by rolling bodies 45, 46 on annular element 80" are parallel to axis I and have null or substantially null respective radial components. This is advantageous, as it prevents annular element 80" from being pushed radially against ring 41.

In other words, rolling bearing 40" approximates a condition in which bases 71 of rolling bodies 45 are directly in contact with respective bases 71 of rolling bodies 46 and the resulting contact forces are perfectly balanced parallel to axis I.

In addition, since rolling bodies 45, 46 are housed in respective groups of alveoli 95" aligned to one another parallel to axis I, the contact forces exerted by rolling bodies 45, 46 respectively on surfaces 81" and 82" are mutually balanced parallel to axis I. As a result, the axial position of annular element 80" relative to ring 41 is not influenced by the contact forces and surfaces 81", 82" are kept orthogonal to axis I.

In addition, since seal 91" is integrated is cage 90", the assembly of seal 91" and cage 90" is advantageously axially compact.

Since seal 91" comprises one or more through holes 96", it is possible to lubricate the contact regions of cage 90" and ring 43", thereby limiting the generation of friction and heat.

In addition, the rolling bearing 40" comprising seal 91" only and not also the further seal opposite to seal 91" is particularly advantageous for efficiently discharging the lubricating oil and possible metallic chips toward environment 122.

Furthermore, surfaces 81" and 82" define respective third raceways of rolling bearing 40". In detail, rolling bodies 45, 46 roll at the same time on three raceways 42, 44, 81", 82", which may rotate at respective different angular speeds with respect to axis I. This allows the forces acting between rolling bodies 45, 46 and the three raceways 42, 44, 81", 82" to be efficiently balanced and the sliding to be minimized.

Finally, it is clear that modifications and variations can be made to the planetary gear 21 previously described without thereby departing from the scope of protection of the present invention.

In particular, the rolling bearing 40 may comprise a single crown 47, 48 of rolling bodies 45, 46.

Furthermore, the crown 17 of the planetary gear 21 may be rotatable around the axis D with a different angular speed than that of the sun 15.

Furthermore, the mechanical power could enter the planetary gear 21 at the satellite carrier 30 and exit it, at the sun 15 with the correct torque value and number of revolutions.

Further, the transmission 9 may comprise two or more planetary gears 21, 21" in series or in parallel with each other.

Further, the transmission 9 may be at least partially integrated into one of the turbines 10.

In addition, each rolling bearing 40" might comprise annular element 80", but might not comprise seal 91" and/or shoulders 65". By way of example, each rolling bearing 40" might comprise annular element 80", seal 91 in place of seal 91" and/or cage guides 65 in place of shoulders 65".

Each rolling bearing 40" might comprise seal 91", but might not comprise annular element 80" and/or shoulders 65". By way of example, each rolling bearing 40" might comprise seal 91" and cage guides 65 in place of shoulders 65".

Each rolling bearing 40" might comprise shoulders 65", but might not comprise annular element 80" and/or seal 91". By way of example, each rolling bearing 40" might comprise shoulders 65" and seal 91 in place of seal 91"

Finally, the transmission 9 and the planetary gear 21, 21" could be used in a helicopter or in a heliplane or in an aircraft capable of remote-piloted hovering commonly referred to as a UAV.

The invention claimed is:

1. Planetary gear for a transmission of an aircraft capable of hovering, comprising:
   a sun rotatable around a first axis with a first angular speed;
   a crown angularly fixed with respect to said first axis or rotatable around said first axis with a second angular speed different from said first angular speed;
   at least two satellites meshing, each, with said crown and said sun, which are rotatable around respective second axes, which are in turn rotatable around said first axis;
   a satellite carrier rotatable around said first axis and comprising at least two first pins with respect to which said satellites are rotatable around respective said second axes; and
   a plurality of rolling bearings interposed, each, between a respective pin and a respective satellite so as to allow the relative rotation thereof around the respective second axis;
   said bearing each comprising, in turn:
   a first ring angularly integral with said pin and defining a first raceway that is at least partially spherical;
   a second ring angularly integral with the respective said satellite and defining a second raceway; and
   a plurality of rolling bodies, radially interposed between said first and second ring, and rolling, in use, on said first and second raceway;
   each said rolling body being in contact with said first raceway at a first curved and convex line on the side of the rolling body; said first line comprising first axial ends that are opposite one another and lying on a first straight line;
   each said rolling body being in contact with said second raceway at a second curved and convex line on the side of the rolling body; said second curved line comprising second axial ends that are opposite one another and lying on a second straight line;
   wherein said rolling bodies are concave and shaped as a conical hourglass;
   said first and second straight line being tilted between them and converging in first points lying on a third axis of said rolling body and on said second axis;
   said first and second straight line defining a first angle, whose bisector lies on said third axis;
   said rolling bearing comprising a first and a second crown formed respectively by first and second said rolling bodies that are angularly spaced around the respective said second axis;
   said crowns being axially staggered relative to said second axis;

said first points being arranged on respective sides that are axially opposite one another of said rolling bearing;
each said rolling body comprising:
a first axial end; and
a second axial end, which is axially opposite to said first axial end along said third axis of said rolling body;
said second ring of each rolling bearing comprising:
a first and a second element adapted to guide a cage for spacing said rolling bodies; and
a shoulder axially interposed between said first and second element and adapted to axially cooperate with said first axial ends that are opposite to said first and second element of respective first and second rolling bodies of respective first and second crowns;
wherein said first axial ends are shaped as aspherical caps generated by the revolution around said third axis of a circular segment having its centre on a respective second point that is eccentric with respect to the respective said third axis.

2. Planetary gear according to claim 1, wherein said second axis and said first straight line define a second acute angle ranging between 10 and 20 degrees.

3. Planetary gear according to claim 1, wherein said first axial ends of each said rolling body contact said shoulder in an at least one said respective second point that is eccentric with respect to the respective said third axis.

4. Planetary gear according to claim 1, wherein said shoulder of each said second ring has a ring conformation with trapezoidal section tapered towards the respective said first ring.

5. Planetary gear according to claim 1, wherein said first and second rolling bodies of each said rolling bearing comprise respective third axes; each said first and second rolling body comprising a respective first and second centre lying on the respective said third axis and equidistant from the respective said first and second axial ends along the relative said third axis;
said first and second centre defining respectively a second and a third plane that are arranged, in use, parallel to each other and orthogonal to said second axis of the relative satellite.

6. Planetary gear according to claim 1, wherein said cage comprises:
a first group of through alveoli, which are each adapted to house a respective said first rolling body; and
a second group of through alveoli, which are each adapted to a house a respective said second rolling body;
said first group being spaced from said second group parallel to said second axis;
each through alveolus from said first group being aligned to a respective through alveolus from said second group parallel to said second axis.

7. Aircraft capable of hovering, comprising:
a motor member;
at least one rotor operatively connected to said motor member;
at least one drive shaft rotatable around said first axis and adapted to drive said rotor;
at least one transmission interposed between said motor member and said rotor; and
said planetary gear according to claim 1;
said aircraft being a convertiplane or a helicopter or a heliplane;
said convertiplane comprising, in turn, a pair of said motor members, a pair of said rotors and a pair of said transmissions each interposed between a respective motor member and a respective rotor.

8. Planetary gear for a transmission of an aircraft capable of hovering, comprising:
a sun rotatable around a first axis with a first angular speed;
a crown angularly fixed with respect to said first axis or rotatable around said first axis with a second angular speed different from said first angular speed;
at least two satellites meshing, each, with said crown and said sun, which are rotatable around respective second axes, which are in turn rotatable around said first axis;
a satellite carrier rotatable around said first axis and comprising at least two first pins with respect to which said satellites are rotatable around respective said second axes; and
a plurality of rolling bearings interposed, each, between a respective pin and a respective satellite so as to allow the relative rotation thereof around the respective second axis;
said bearing each comprising, in turn:
a first ring angularly integral with said pin and defining a first raceway that is at least partially spherical;
a second ring angularly integral with the respective said satellite and defining a second raceway; and
a plurality of rolling bodies, radially interposed between said first and second ring, and rolling, in use, on said first and second raceway;
each said rolling body being in contact with said first raceway at a first curved and convex line on the side of the rolling body; said first line comprising first axial ends that are opposite one another and lying on a first straight line;
each said rolling body being in contact with said second raceway at a second curved and convex line on the side of the rolling body; said second curved line comprising second axial ends that are opposite one another and lying on a second straight line;
wherein said rolling bodies are concave and shaped as a conical hourglass;
said first and second straight line being tilted between them and converging in first points lying on a third axis of said rolling body and on said second axis;
said first and second straight line defining a first angle, whose bisector lies on said third axis;
said rolling bearing comprising a first and a second crown formed respectively by first and second said rolling bodies that are angularly spaced around the respective said second axis;
said crowns being axially staggered relative to said second axis;
said first points being arranged on respective sides that are axially opposite one another of said rolling bearing;
each said rolling body comprising:
a first axial end; and
a second axial end, which is axially opposite to said first axial end along said third axis of said rolling body;
said second ring of each rolling bearing comprising:
a first and a second element adapted to guide a cage for spacing said rolling bodies; and
a shoulder axially interposed between said first and second element and adapted to axially cooperate with said first axial ends that are opposite to said first and second element of respective first and second rolling bodies of respective first and second crowns;
wherein said cage is arranged in abutment against said first and second cage-guiding element and shoulder of the relative said rolling bearing.

9. Planetary gear for a transmission of an aircraft capable of hovering, comprising:
- a sun rotatable around a first axis with a first angular speed;
- a crown angularly fixed with respect to said first axis or rotatable around said first axis with a second angular speed different from said first angular speed;
- at least two satellites meshing, each, with said crown and said sun, which are rotatable around respective second axes, which are in turn rotatable around said first axis;
- a satellite carrier rotatable around said first axis and comprising at least two first pins with respect to which said satellites are rotatable around respective said second axes; and
- a plurality of rolling bearings interposed, each, between a respective pin and a respective satellite so as to allow the relative rotation thereof around the respective second axis;

said bearing each comprising, in turn:
- a first ring angularly integral with said pin and defining a first raceway that is at least partially spherical;
- a second ring angularly integral with the respective said satellite and defining a second raceway; and
- a plurality of rolling bodies, radially interposed between said first and second ring, and rolling, in use, on said first and second raceway;
- each said rolling body being in contact with said first raceway at a first curved and convex line on the side of the rolling body; said first line comprising first axial ends that are opposite one another and lying on a first straight line;
- each said rolling body being in contact with said second raceway at a second curved and convex line on the side of the rolling body; said second curved line comprising second axial ends that are opposite one another and lying on a second straight line;
- wherein said rolling bodies are concave and shaped as a conical hourglass;
- said first and second straight line being tilted between them and converging in first points lying on a third axis of said rolling body and on said second axis;
- said first and second straight line defining a first angle, whose bisector lies on said third axis;
- said rolling bearing comprising a first and a second crown formed respectively by first and second said rolling bodies that are angularly spaced around the respective said second axis;
- said crowns being axially staggered relative to said second axis;
- said first points being arranged on respective sides that are axially opposite one another of said rolling bearing;
- each said rolling body comprising:
- a first axial end; and
- a second axial end, which is axially opposite to said first axial end along said third axis of said rolling body;
- said second ring of each rolling bearing comprising:
- a first and a second element adapted to guide a cage for spacing said rolling bodies; and
  - a shoulder axially interposed between said first and second element and adapted to axially cooperate with said first axial ends that are opposite to said first and second element of respective first and second rolling bodies of respective first and second crowns;
- said planetary gear further including a first annular element for collecting a lubricating fluid intended to lubricate said rolling bodies of said bearings of at least two said satellites and arranged on a first side with respect to said rolling bearing; and
- means for conveying said lubricating fluid adapted to convey said lubricating fluid in contact with said rolling bodies; said first ring, second ring and rolling bodies of each said rolling bearing defining a chamber that can be crossed by said lubricating fluid;

said chamber being fluidically connected to said first annular element.

10. Planetary gear according to claim 9, wherein said conveying means comprise, for each said satellite, a collecting element housed within the relative pin and in fluidic communication with said first annular element and said chamber.

11. Planetary gear according to claim 10, wherein said collecting element comprises a plurality of first circumferential and through openings that can be crossed, in use, by said lubricating fluid;
- said pin comprising a plurality of radial first holes arranged at and in fluidic communication with said first openings of said collecting element;
- said first ring comprising a plurality of second radial holes in fluidic communication with said chamber and with said first holes.

12. Planetary gear according to claim 11, wherein said first ring comprises:
- at least one first axial end element; and
- a second axial element arranged coaxially to said at least one axial end element and defining said first raceway;

said second holes being defined by said at least one first axial end element of said first ring.

13. Planetary gear according to claim 12, further comprising a first sealing element adapted to fluid-tightly isolate said chamber, fixed to said second ring and facing said first axial end element of said first ring.

14. Planetary gear according to claim 13, wherein said first sealing element is integrated in said cage.

15. Planetary gear according to claim 14, wherein said first sealing element comprises at least one fourth hole, which is through and radial;
- said at least one fourth hole being adapted to be passed through by lubricant oil.

16. Planetary gear according to any one of claim 10, wherein:
- said collecting element comprises a plurality of second circumferential and through openings that can be crossed, in use, by said lubricating fluid; said second openings being axially staggered over said first openings;
- said pin comprising a plurality of third radial, through holes arranged at and in fluidic communication with said second openings of said collecting element;
- said first and third holes being axially staggered between them;
- said first raceway of said first ring comprising a plurality of fourth radial and through holes in fluidic communication with said chamber and with said third holes;
- said planetary gear, further comprising a second sealing element adapted to fluid-tightly isolate said chamber, fixed to said second ring and facing a further first axial end element of said first ring.

17. Planetary gear for a transmission of an aircraft capable of hovering, comprising:
- a sun rotatable around a first axis with a first angular speed;

a crown angularly fixed with respect to said first axis or rotatable around said first axis with a second angular speed different from said first angular speed;

at least two satellites meshing, each, with said crown and said sun, which are rotatable around respective second axes, which are in turn rotatable around said first axis;

a satellite carrier rotatable around said first axis and comprising at least two first pins with respect to which said satellites are rotatable around respective said second axes; and a plurality of rolling bearings interposed, each, between a respective pin and a respective satellite so as to allow the relative rotation thereof around the respective second axis;

said bearing each comprising, in turn:

a first ring angularly integral with said pin and defining a first raceway that is at least partially spherical;

a second ring angularly integral with the respective said satellite and defining a second raceway; and a plurality of rolling bodies, radially interposed between said first and second ring, and rolling, in use, on said first and second raceway;

each said rolling body being in contact with said first raceway at a first curved and convex line on the side of the rolling body; said first line comprising first axial ends that are opposite one another and lying on a first straight line;

each said rolling body being in contact with said second raceway at a second curved and convex line on the side of the rolling body; said second curved line comprising second axial ends that are opposite one another and lying on a second straight line;

wherein said rolling bodies are concave and shaped as a conical hourglass;

said first and second straight line being tilted between them and converging in first points lying on a third axis of said rolling body and on said second axis;

said first and second straight line defining a first angle, whose bisector lies on said third axis;

said rolling bearing comprising a first and a second crown formed respectively by first and second said rolling bodies that are angularly spaced around the respective said second axis;

said crowns being axially staggered relative to said second axis;

said first points being arranged on respective sides that are axially opposite one another of said rolling bearing;

each said rolling body comprising:

a first axial end; and a second axial end, which is axially opposite to said first axial end along said third axis of said rolling body;

said second ring of each rolling bearing comprising:

a first and a second element adapted to guide a cage for spacing said rolling bodies; and a shoulder axially interposed between said first and second element and adapted to axially cooperate with said first axial ends that are opposite to said first and second element of respective first and second rolling bodies of respective first and second crowns;

wherein each rolling bearing comprises a further annular element, which is unconstrained with respect to said first and second rings and is interposed between said first ring and said second ring radially with respect to said second axis and between said first and second rolling bodies axially with respect to said second axis.

18. Planetary gear according to claim 17, wherein each rolling bearing comprises a median plane along the axial extension of said rolling bearing parallel to said second axis;

each said first axial end comprising, proceeding radially from said second ring to said first ring:

a first stretch, comprising third points arranged at progressively decreasing distances from said median plane;

a second stretch, which comprises fourth points; and a third stretch, comprising fifth points arranged at respective progressively increasing distances from said median plane;

said further annular element comprising a first and a second flat surface opposite to each other along said second axis and facing respectively said first and second rolling bodies;

wherein a plane tangent to said first axial end at said fourth points is parallel to said median plane;

said first and second flat surfaces being in contact with said first axial end of each said respective first and second rolling bodies at respective said second stretches.

19. Planetary gear according to claim 18, wherein said first and second flat surfaces and said first axial end of each said respective first and second rolling bodies are in direct contact and define respective contact regions;

said contact regions lying on respective planes orthogonal to said second axis (I).

20. Planetary gear according to claim 18, wherein said first and second flat surfaces are orthogonal to said second axis.

21. Planetary gear according to claim 18, wherein said first and second flat surfaces define a third raceway of said rolling bearing respectively for said first rolling body and said second rolling body; said first, second and third raceways being rotatable at respective different angular speeds with respect to said second axis.

22. Planetary gear according to claim 17, wherein said rolling bodies and said annular element are adapted to roll on one another substantially without slipping.

23. Planetary gear for a transmission of an aircraft capable of hovering, comprising:

a sun rotatable around a first axis with a first angular speed;

a crown angularly fixed with respect to said first axis or rotatable around said first axis with a second angular speed different from said first angular speed;

at least two satellites meshing, each, with said crown and said sun, which are rotatable around respective said second axes, which are in turn rotatable around said first axis;

a satellite carrier rotatable around said first axis and comprising at least two first pins with respect to which said satellites are rotatable around respective said second axes; and a plurality of rolling bearings interposed, each, between one first pin of said two first pins and one satellite of said at least two satellites so as to allow the relative rotation thereof around the respective second axis;

said bearing each comprising, in turn:

a first ring angularly integral with said pin and defining a first raceway that is at least partially spherical;

a second ring angularly integral with the respective said satellite and defining a second raceway; and a plurality of rolling bodies, radially interposed between said first and second ring, and rolling, in use, on said first and second raceway;

each said rolling body being in contact with said first raceway at a first curved and convex line on the side of the rolling body; said first line comprising first axial ends that are opposite one another and lying on a first straight line;
each said rolling body being in contact with said second raceway at a second curved and convex line on the side of the rolling body; said second curved line comprising second axial ends that are opposite one another and lying on a second straight line;
wherein said rolling bodies are concave and shaped as a conical hourglass;
said first and second straight line being tilted between them and converging in a first point lying on a third axis of said rolling body and on said second axis;
said first and second straight line defining a first angle, whose bisector lies on said third axis;
  said planetary gear comprising: a first annular element for collecting a lubricating fluid intended to lubricate said rolling bodies of said bearings of at least two said satellites and arranged on a first side with respect to said rolling bearing; and
  means for conveying said lubricating fluid adapted to convey said lubricating fluid in contact with said rolling bodies; said first ring, second ring and rolling bodies of each said rolling bearing defining a chamber that can be crossed by said lubricating fluid;
said chamber being fluidically connected to said first annular element;
said conveying means comprising, for each said satellite, a collecting element housed within the relative pin and in fluidic communication with said first annular element and said chamber;
said collecting element comprising a plurality of first circumferential and through openings that can be crossed, in use, by said lubricating fluid;
said pin comprising a plurality of radial first holes arranged at and in fluidic communication with said first openings of said collecting element;
said first ring comprising a plurality of second radial holes in fluidic communication with said chamber and with said first holes.

* * * * *